United States Patent
Chen et al.

(10) Patent No.: US 11,895,319 B2
(45) Date of Patent: Feb. 6, 2024

(54) METHOD FOR CONSTRUCTING CANDIDATE MOTION INFORMATION LIST, INTER PREDICTION METHOD, AND APPARATUS

(71) Applicant: Huawei Technologies Co., Ltd., Shenzhen (CN)

(72) Inventors: Huanbang Chen, Shenzhen (CN); Ting Fu, Shenzhen (CN); Haitao Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/188,691

(22) Filed: Mar. 1, 2021

(65) Prior Publication Data
US 2021/0185351 A1 Jun. 17, 2021

Related U.S. Application Data

(63) Continuation of application No. PCT/CN2019/102026, filed on Aug. 22, 2019.

(30) Foreign Application Priority Data

Aug. 28, 2018 (CN) .......................... 201810990444.2
Aug. 29, 2018 (CN) .......................... 201810997139.6

(51) Int. Cl.
*H04N 19/52* (2014.01)
*H04N 19/577* (2014.01)
(52) U.S. Cl.
CPC ........... *H04N 19/52* (2014.11); *H04N 19/577* (2014.11)
(58) Field of Classification Search
CPC ........................... H04N 19/52; H04N 19/577
See application file for complete search history.

(56) References Cited

U.S. PATENT DOCUMENTS 9,438,910 B1    9/2016 Han et al.
2017/0332095 A1    11/2017 Zou et al.
(Continued)

FOREIGN PATENT DOCUMENTS

CN    103339938 A    10/2013
CN    104935938 A    9/2015
(Continued)

OTHER PUBLICATIONS

Yang et al., "Draft text for affine motion compensation," Joint Video Experts Team (JVET) of ITU-T SG 16 WP 3 and ISO/IEC JTC 1/SC 29/WG 11, 11th Meeting: Ljubljana, SI, Document: JVET-K0565-v2, total 61 pages (Jul. 10-18, 2018).
(Continued)

*Primary Examiner* — Jeremiah C Hallenbeck-Huber
(74) *Attorney, Agent, or Firm* — Leydig, Voit & Mayer, Ltd.

(57) ABSTRACT

A motion information candidate list construction method includes: performing a first processing process on all neighboring image blocks of a current image block until a quantity of candidate motion information sets in a candidate motion information list is equal to a first preset value or all the neighboring image blocks are traversed; then traversing at least two extra to be selected motion information sets, and storing, in the candidate motion information list, an extra to be selected motion information set that satisfies a preset condition, until the quantity of candidate motion information sets in the candidate motion information list is equal to a preset quantity value or the extra to be selected motion information sets are traversed extra to be selected motion.

14 Claims, 9 Drawing Sheets

(56) References Cited

U.S. PATENT DOCUMENTS

| | | | |
|---|---|---|---|
| 2018/0098063 A1* | 4/2018 | Chen | H04N 19/105 |
| 2018/0192069 A1 | 7/2018 | Chen et al. | |
| 2019/0028731 A1 | 1/2019 | Chuang et al. | |
| 2019/0058896 A1* | 2/2019 | Huang | H04N 19/105 |
| 2019/0335170 A1* | 10/2019 | Lee | H04N 19/176 |
| 2020/0221120 A1* | 7/2020 | Robert | H04N 19/567 |
| 2020/0244989 A1* | 7/2020 | Lee | H04N 19/51 |

FOREIGN PATENT DOCUMENTS

| | | |
|---|---|---|
| CN | 106537915 A | 3/2017 |
| CN | 107079161 A | 8/2017 |
| CN | 108111846 A | 6/2018 |
| CN | 108271023 A | 7/2018 |
| CN | 108293131 A | 7/2018 |
| CN | 108353184 A | 7/2018 |
| CN | 109729352 A | 5/2019 |
| CN | 110024384 A | 7/2019 |
| CN | 107710761 B | 2/2020 |
| CN | 107529063 B | 3/2020 |
| CN | 112004098 B | 6/2021 |
| IN | 108432250 A | 8/2018 |
| WO | 2017003063 A1 | 1/2017 |
| WO | 2017171107 A1 | 10/2017 |
| WO | 2018026118 A1 | 2/2018 |
| WO | 2018061522 A1 | 4/2018 |

OTHER PUBLICATIONS

Yang et al., "Description of CE4: Inter prediction and motion vector coding," Joint Video Experts Team (JVET) of ITU-SG 16 WP 3 and ISO/IEC JTC 1/SC 29/WG 11, Document: Jvet-J1024, 10th Meeting: San Diego, US, pp. 1-44 (Apr. 10-20, 2018).

Yang et al., "Description of Core Experiment 4 (CE4): Inter prediction and motion vector coding," Joint Video Experts Team (JVET) of ITU-T SG 16 WP 3 and ISO/IEC JTC 1/SC 29/WG 11, 11th Meeting: Ljubljana, SI, Document: JVET-K1024-v2, Total 55 pages (Jul. 10-18, 2018).

* cited by examiner

METHOD FOR CONSTRUCTING CANDIDATE MOTION INFORMATION LIST, INTER PREDICTION METHOD, AND APPARATUS

CROSS-REFERENCE TO RELATED APPLICATIONS

This application is a continuation of International Application No. PCT/CN2019/102026, filed on Aug. 22, 2019, which claims priority to Chinese Patent Application No. 201810990444.2, filed on Aug. 28, 2018 and priority to Chinese Patent Application No. 201810997139.6, filed on Aug. 29, 2018. The disclosures of the aforementioned applications are hereby incorporated by reference in their entireties.

TECHNICAL FIELD

Embodiments of this application relate to the field of video image coding technologies, and in particular, to a method for constructing a candidate motion information list, an inter prediction method, and an apparatus.

BACKGROUND

In a non-translational motion model prediction mode, an encoder/decoder side derives, based on motion information of a control point of a current image block, motion information of all subblocks of the current image block by using a same motion model, and performs motion compensation based on the motion information of all the subblocks to obtain a prediction image block. Generally, an image block predicted in this manner is referred to as an affine coding block.

Usually, the encoder/decoder side may obtain motion information of a control point of the affine coding block by using an affine advanced motion vector prediction mode (Affine AMVP mode) or an affine merge mode (Affine Merge mode). Specifically, the encoder/decoder side constructs a candidate motion information list, and determines the motion information of the control point based on candidate motion information in the list. In a process of constructing the candidate motion information list, before adding a new candidate motion information set to the candidate motion information list each time, the encoder/decoder side first checks whether the same motion information set already exists in the candidate motion information list. If the same motion information set exists in the candidate motion information list, the encoder/decoder side does not add the new candidate motion information set to the list.

This process is referred to as pruning of the candidate motion information list. Pruning of the candidate motion information list can prevent same motion information in the candidate motion information list, and avoid redundant rate-distortion cost calculation. However, calculation complexity of this process is also relatively high, and a delay is relatively long.

SUMMARY

Embodiments of this application provide a method for constructing a candidate motion information list, an inter prediction method, and an apparatus, to resolve a problem that calculation complexity is relatively high and a delay is relatively long.

To achieve the foregoing objectives, the following technical solutions are used in the embodiments of this application:

According to a first aspect, a method for constructing a candidate motion information list is provided. An apparatus for constructing a candidate motion information list (referred to as a construction apparatus below) sequentially performs a first processing process on all neighboring image blocks of a current image block in a first preset order, until a quantity of candidate motion information sets in a candidate motion information list is equal to a first preset value or all the neighboring image blocks are traversed. After the quantity of candidate motion information sets in the candidate motion information list is equal to the first preset value or all the neighboring image blocks are traversed, the construction apparatus sequentially traverses at least two extra to be selected motion information sets in a second preset order, and stores, in the candidate motion information list, an extra to be selected motion information set that satisfies a preset condition, until the quantity of candidate motion information sets in the candidate motion information list is equal to a preset quantity value or all the extra to be selected motion information sets are traversed. Herein, the preset quantity value is greater than the first preset value, the extra to be selected motion information set includes extra to be selected motion information of at least two control points of the current image block, and the extra to be selected motion information of the control point is motion information of an inter-coded image block adjacent to the current image block. If a quantity of candidate motion information sets in the candidate motion information list is less than the preset quantity value after all the extra to be selected motion information sets are traversed, the construction apparatus fills the candidate motion information list with a first preset candidate motion information set until the quantity of candidate motion information sets in the candidate motion information list is equal to the preset quantity value. Specifically, the first processing process is as follows: For the $i^{th}$ ($i\in[1, n]$) neighboring image block, when the $i^{th}$ neighboring image block is an affine coding block, the construction apparatus determines whether the $i^{th}$ neighboring image block and a candidate motion information set that has been stored in the candidate motion information list come from a same coding unit. If no candidate motion information set from the coding unit to which the $i^{th}$ neighboring image block belongs exists in the candidate motion information list, the construction apparatus determines candidate motion information of x control points of the current image block based on motion information of x control points of the $i^{th}$ neighboring image block, and stores, in the candidate motion information list, a candidate motion information set including the candidate motion information of the x control points of the current image block, where n is a quantity of neighboring image blocks of the current image block, and both x and n are integers greater than or equal to 2.

It can be learned that, in the first processing process, when the $i^{th}$ neighboring image block is the affine coding block, the construction apparatus only needs to determine whether the $i^{th}$ neighboring image block and the candidate motion information set that has been stored in the candidate motion information list come from the same coding unit, and determine, based on a determining result, whether to add a new candidate motion information set to the candidate motion information list, and does not need to calculate the new candidate motion information set and then determine whether same motion information exists in the candidate motion information list. This effectively reduces calculation complexity and a delay.

Optionally, in a possible implementation of this application, reference frame indexes of all control points in the extra to be selected motion information set that satisfies the preset condition are the same; or reference frame indexes of all control points in the extra to be selected motion information set that satisfies the preset condition are the same and extra to be selected motion vectors of at least two control points in the extra to be selected motion information set that satisfies the preset condition are different.

The construction apparatus only determines reference frame indexes and extra to be selected motion vectors of all control points in an extra to be selected motion information set, and determines, based on a determining result, whether to store the extra to be selected motion information set in the candidate motion information list, without performing motion vector scaling. This reduces the calculation complexity.

Optionally, in another possible implementation of this application, a method used by the construction apparatus to determine whether the $i^{th}$ neighboring image block and the candidate motion information set that has been stored in the candidate motion information list come from the same coding unit is as follows: The construction apparatus determines whether information of the top-left corner of the coding unit to which the $i^{th}$ neighboring image block belongs is the same as information of the top-left corner of a target coding unit, where the target coding unit herein is a coding unit to which a neighboring image block used to calculate the candidate motion information set that has been stored in the candidate motion information list belongs.

In an image block prediction process, a size of the coding unit is fixed. The construction apparatus may directly determine, based on the information of the top-left corner of the coding unit, whether the $i^{th}$ neighboring image block and the candidate motion information set that has been stored in the candidate motion information list come from the same coding unit. The determining process is simple and efficient.

Optionally, in another possible implementation of this application, the extra to be selected motion information set includes at least extra to be selected motion information of a first control point and extra to be selected motion information of a second control point, where the first control point and the second control point are neighboring control points of the current image block.

According to a second aspect, a method for constructing a candidate motion information list is provided. A construction apparatus sequentially performs a first processing process on all neighboring image blocks of a current image block in a first preset order, until a quantity of candidate motion information sets in a first candidate motion information list is equal to a first preset value or all the neighboring image blocks are traversed. In addition, the construction apparatus further sequentially traverses at least two extra to be selected motion information sets in a second preset order, and stores, in a second candidate motion information list, an extra to be selected motion information set that satisfies a preset condition, until a quantity of candidate motion information sets in the second candidate motion information list is equal to a second preset value or all the extra to be selected motion information sets are traversed. The extra to be selected motion information set includes extra to be selected motion information of at least two control points of the current image block, and the extra to be selected motion information of the control point is motion information of an inter-coded image block adjacent to the current image block. If a quantity of candidate motion information sets in the second candidate motion information list is less than the second preset value after all the extra to be selected motion information sets are traversed, the construction apparatus fills the second candidate motion information list with a second preset candidate motion information set until the quantity of candidate motion information sets in the second candidate motion information list is equal to the second preset value. Then, the construction apparatus merges the first candidate motion information list and the second candidate motion information list according to a preset rule, to obtain a third candidate motion information list. A quantity of candidate motion information sets in the third candidate motion information list is equal to a preset quantity value, and a sum of the first preset value and the second preset value is greater than or equal to the preset quantity value.

Specifically, the first processing process is as follows: For the $i^{th}$ ($i \in [1, n]$) neighboring image block, when the $i^{th}$ neighboring image block is an affine coding block, the construction apparatus determines whether the $i^{th}$ neighboring image block and a candidate motion information set that has been stored in the first candidate motion information list come from a same coding unit. If no candidate motion information set from the coding unit to which the $i^{th}$ neighboring image block belongs exists in the candidate motion information list, the construction apparatus determines candidate motion information of x control points of the current image block based on motion information of x control points of the $i^{th}$ neighboring image block, and stores, in the candidate motion information list, a candidate motion information set including the candidate motion information of the x control points of the current image block, where n is a quantity of neighboring image blocks of the current image block, and both x and n are integers greater than or equal to 2.

Reference frame indexes of all control points in the extra to be selected motion information set that satisfies the preset condition are the same; or reference frame indexes of all control points in the extra to be selected motion information set that satisfies the preset condition are the same and extra to be selected motion vectors of at least two control points in the extra to be selected motion information set that satisfies the preset condition are different.

In both the first processing process and a processing process of the extra to be selected motion information set in this application, whether to add a new candidate motion information set to the candidate motion information list is determined based on a determining result, and there is no need to first calculate the new candidate motion information set and then determine whether same motion information exists in the candidate motion information list. This effectively reduces calculation complexity and a delay.

Optionally, in another possible implementation of this application, the extra to be selected motion information set includes at least extra to be selected motion information of a first control point and extra to be selected motion information of a second control point, where the first control point and the second control point are neighboring control points of the current image block.

Optionally, in another possible implementation of this application, a method used by the construction apparatus to merge the first candidate motion information list and the second candidate motion information list according to the preset rule to obtain the third candidate motion information list is as follows: The construction apparatus places all candidate motion information sets in the first candidate motion information list before all candidate motion information sets in the second candidate motion information list, to generate a target candidate motion information list; and if a quantity of candidate motion information sets in the target candidate motion information list is less than the preset quantity value, fills the target candidate motion information list with the second preset candidate motion information set until the quantity of candidate motion information sets in the target candidate motion information list is equal to the preset quantity value, and uses, as the third candidate motion information list, a target candidate motion information list obtained after filling; if a quantity of candidate motion information sets in the target candidate motion information list is equal to the preset quantity value, uses the target candidate motion information list as the third candidate motion information list; or if a quantity of candidate motion information sets in the target candidate motion information list is greater than the preset quantity value, deletes at least one piece of candidate motion information from the target candidate motion information list, so that a quantity of candidate motion information sets in a target candidate motion information list obtained after deletion is equal to the preset quantity value, and uses, as the third candidate motion information list, the target candidate motion information list obtained after deletion.

According to a third aspect, a method for constructing a candidate motion information list is provided. A construction apparatus traverses all neighboring image blocks of a current image block in a first preset order, to generate a candidate motion information list including at least one candidate motion information set, where the candidate motion information set includes candidate motion information of x control points of the current image block, and x is an integer greater than or equal to 2. After traversing all the neighboring image blocks of the current image block, the construction apparatus sequentially traverses at least two extra to be selected motion information sets in a second preset order, and stores, in the candidate motion information list, an extra to be selected motion information set that satisfies a preset condition, until a quantity of candidate motion information sets in the candidate motion information list is equal to a preset quantity value or all the extra to be selected motion information sets are traversed. If a quantity of candidate motion information sets in the candidate motion information list is less than the preset quantity value after all the extra to be selected motion information sets are traversed, the construction apparatus fills the candidate motion information list with a third preset candidate motion information set until the quantity of candidate motion information sets in the candidate motion information list is equal to the preset quantity value. Herein, the extra to be selected motion information set includes extra to be selected motion information of at least two control points of the current image block, and the extra to be selected motion information of the control point is motion information of an inter-coded image block adjacent to the current image block. Reference frame indexes of all control points in the extra to be selected motion information set that satisfies the preset condition are the same; or reference frame indexes of all control points in the extra to be selected motion information set that satisfies the preset condition are the same and extra to be selected motion vectors of at least two control points in the extra to be selected motion information set that satisfies the preset condition are different.

It can be learned that, when processing an extra to be selected motion information set, the construction apparatus only determines reference frame indexes and extra to be selected motion vectors of all control points in the extra to be selected motion information set, and determines, based on a determining result, whether to store the extra to be selected motion information set in the candidate motion information list. The construction apparatus neither needs to perform motion vector scaling, nor needs to first calculate a new candidate motion information set and then determine whether same motion information exists in the candidate motion information list. This reduces computing complexity and a delay.

Optionally, in another possible implementation of this application, the extra to be selected motion information set includes at least extra to be selected motion information of a first control point and extra to be selected motion information of a second control point, where the first control point and the second control point are neighboring control points of the current image block.

According to a fourth aspect, an inter prediction method is provided. An inter prediction apparatus obtains and parses a bitstream, to obtain a first index value and a motion information difference, where the first index value herein is an index value of a motion information predictor of a control point of a current image block in a candidate motion information list, and the candidate motion information list is generated by the foregoing construction apparatus by using the construction method described in any one of the first aspect, the second aspect, the third aspect, or the possible implementations thereof. Then, the inter prediction apparatus obtains the motion information predictor of the control point from the candidate motion information list based on the first index value, and determines motion information of the control point based on the motion information predictor of the control point and the motion information difference. In this way, the inter prediction apparatus may determine prediction pixels of the current image block based on the motion information of the control point.

The inter prediction apparatus performs inter prediction based on the candidate motion information list generated according to the construction method described in any one of the first aspect, the second aspect, the third aspect, or the possible implementations thereof. In a process in which the construction apparatus in this application generates the candidate motion information list, calculation complexity and a delay are effectively reduced. Therefore, the inter prediction apparatus performs inter prediction at a relatively high speed.

According to a fifth aspect, an inter prediction method is provided. An inter prediction apparatus obtains and parses a bitstream, to obtain a second index value, where the second index value is an index value of motion information of a control point of a current image block in a candidate motion information list, and the candidate motion information list is generated by the foregoing construction apparatus by using the construction method described in any one of the first aspect, the second aspect, the third aspect, or the possible implementations thereof. Then, the inter prediction apparatus obtains the motion information of the control point from the candidate motion information list based on the second index value, and determines prediction pixels of the current image block based on the motion information of the control point.

The inter prediction apparatus performs inter prediction based on the candidate motion information list generated according to the construction method described in any one of the first aspect, the second aspect, the third aspect, or the possible implementations thereof. In a process in which the construction apparatus in this application generates the candidate motion information list, calculation complexity and a delay are effectively reduced. Therefore, the inter prediction apparatus performs inter prediction at a relatively high speed.

According to a sixth aspect, an apparatus for constructing a candidate motion information list is provided. The apparatus for constructing a candidate motion information list includes a first processing unit, a second processing unit, a filling unit, and a storage unit.

Specifically, the first processing unit is configured to sequentially perform a first processing process on all neighboring image blocks of a current image block in a first preset order, until a quantity of candidate motion information sets in a candidate motion information list is equal to a first preset value or all the neighboring image blocks are traversed, where the candidate motion information list is stored in the storage unit. The first processing process is as follows: for the $i^{th}$ neighboring image block, when the $i^{th}$ neighboring image block is an affine coding block, determining whether the $i^{th}$ neighboring image block and a candidate motion information set that has been stored in the candidate motion information list come from a same coding unit; and if no candidate motion information set from the coding unit to which the $i^{th}$ neighboring image block belongs exists in the candidate motion information list, determining candidate motion information of x control points of the current image block based on motion information of x control points of the $i^{th}$ neighboring image block, and storing, in the candidate motion information list, a candidate motion information set including the candidate motion information of the x control points of the current image block, where $i \in [1, n]$, n is a quantity of neighboring image blocks of the current image block, and both x and n are integers greater than or equal to 2. The second processing unit is configured to: after the quantity of candidate motion information sets in the candidate motion information list stored in the storage unit is equal to the first preset value or all the neighboring image blocks are traversed, sequentially traverse at least two extra to be selected motion information sets in a second preset order, and store, in the candidate motion information list, an extra to be selected motion information set that satisfies a preset condition, until the quantity of candidate motion information sets in the candidate motion information list is equal to a preset quantity value or all the extra to be selected motion information sets are traversed. The preset quantity value is greater than the first preset value, the extra to be selected motion information set includes extra to be selected motion information of at least two control points of the current image block, and the extra to be selected motion information of the control point is motion information of an inter-coded image block adjacent to the current image block. The filling unit is configured to: if a quantity of candidate motion information sets in the candidate motion information list is less than the preset quantity value after the second processing unit traverses all the extra to be selected motion information sets, fill the candidate motion information list with a first preset candidate motion information set until the quantity of candidate motion information sets in the candidate motion information list is equal to the preset quantity value.

Optionally, in a possible implementation of this application, reference frame indexes of all control points in the extra to be selected motion information set that satisfies the preset condition are the same; or reference frame indexes of all control points in the extra to be selected motion information set that satisfies the preset condition are the same and extra to be selected motion vectors of at least two control points in the extra to be selected motion information set that satisfies the preset condition are different.

Optionally, in another possible implementation of this application, the first processing unit is specifically configured to determine whether information of the top-left corner of the coding unit to which the $i^{th}$ neighboring image block belongs is the same as information of the top-left corner of a target coding unit, where the target coding unit is a coding unit to which a neighboring image block used to calculate the candidate motion information set that has been stored in the candidate motion information list belongs.

Optionally, in another possible implementation of this application, the extra to be selected motion information set includes at least extra to be selected motion information of a first control point and extra to be selected motion information of a second control point, where the first control point and the second control point are neighboring control points of the current image block.

For specific descriptions of any one of the sixth aspect or the possible implementations thereof in this application, refer to the detailed descriptions of any one of the first aspect or the possible implementations thereof. In addition, for beneficial effects of any one of the sixth aspect or the possible implementations thereof, refer to analysis on the beneficial effects of any one of the first aspect or the possible implementations thereof. Details are not described herein again.

According to a seventh aspect, an apparatus for constructing a candidate motion information list is provided. The apparatus for constructing a candidate motion information list includes a first processing unit, a second processing unit, a merging unit, and a storage unit.

Specifically, the first processing unit is configured to sequentially perform a first processing process on all neighboring image blocks of a current image block in a first preset order, until a quantity of candidate motion information sets in a first candidate motion information list is equal to a first preset value or all the neighboring image blocks are traversed, where the first candidate motion information list is stored in the storage unit. The first processing process is as follows: for the $i^{th}$ neighboring image block, when the $i^{th}$ neighboring image block is an affine coding block, determining whether the $i^{th}$ neighboring image block and a candidate motion information set that has been stored in the first candidate motion information list come from a same coding unit; and if no candidate motion information set from the coding unit to which the $i^{th}$ neighboring image block belongs exists in the first candidate motion information list, determining candidate motion information of x control points of the current image block based on motion information of x control points of the $i^{th}$ neighboring image block, and storing, in the first candidate motion information list, a motion information set including the candidate motion information of the x control points of the current image block, where $i \in [1, n]$, n is a quantity of neighboring image blocks of the current image block, and both x and n are integers greater than or equal to 2. The second processing unit is configured to: sequentially traverse at least two extra to be selected motion information sets in a second preset order, and store, in a second candidate motion information list, an extra to be selected motion information set that satisfies a preset condition, until a quantity of candidate motion information sets in the second candidate motion information list is equal to a second preset value or all the extra to be selected motion information sets are traversed, where the extra to be selected motion information set includes extra to be selected motion information of at least two control points of the current image block, the extra to be selected motion information of the control point is motion information of an inter-coded image block adjacent to the current image block, and the second candidate motion information list is stored in the storage unit. Reference frame indexes of all control points in the extra to be selected motion information set that satisfies the preset condition are the same; or reference frame indexes of all control points in the extra to be selected motion information set that satisfies the preset condition are the same and extra to be selected motion vectors of at least two control points in the extra to be selected motion information set that satisfies the preset condition are different. The merging unit is configured to merge, according to a preset rule, the first candidate motion information list and the second candidate motion information list that are in the storage unit, to obtain a third candidate motion information list, where a quantity of candidate motion information sets in the third candidate motion information list is equal to a preset quantity value, and a sum of the first preset value and the second preset value is greater than or equal to the preset quantity value.

Optionally, in a possible implementation of this application, the extra to be selected motion information set includes at least extra to be selected motion information of a first control point and extra to be selected motion information of a second control point, where the first control point and the second control point are neighboring control points of the current image block.

Optionally, in another possible implementation of this application, the merging unit is specifically configured to: place all candidate motion information sets in the first candidate motion information list before all candidate motion information sets in the second candidate motion information list, to generate a target candidate motion information list; and if a quantity of candidate motion information sets in the target candidate motion information list is less than the preset quantity value, fill the target candidate motion information list with a second preset candidate motion information set until the quantity of candidate motion information sets in the target candidate motion information list is equal to the preset quantity value, and use, as the third candidate motion information list, a target candidate motion information list obtained after filling; if a quantity of candidate motion information sets in the target candidate motion information list is equal to the preset quantity value, use the target candidate motion information list as the third candidate motion information list; or if a quantity of candidate motion information sets in the target candidate motion information list is greater than the preset quantity value, delete at least one piece of candidate motion information from the target candidate motion information list, so that a quantity of candidate motion information sets in a target candidate motion information list obtained after deletion is equal to the preset quantity value, and use, as the third candidate motion information list, the target candidate motion information list obtained after deletion.

Optionally, in another possible implementation of this application, the first processing unit is specifically configured to determine whether information of the top-left corner of the coding unit to which the $i^{th}$ neighboring image block belongs is the same as information of the top-left corner of a target coding unit, where the target coding unit is a coding unit to which a neighboring image block used to calculate the candidate motion information set that has been stored in the first candidate motion information list belongs.

For specific descriptions of any one of the seventh aspect or the possible implementations thereof in this application, refer to the detailed descriptions of any one of the second aspect or the possible implementations thereof. In addition, for beneficial effects of any one of the seventh aspect or the possible implementations thereof, refer to analysis on the beneficial effects of any one of the second aspect or the possible implementations thereof. Details are not described herein again.

According to an eighth aspect, an apparatus for constructing a candidate motion information list is provided. The apparatus for constructing a candidate motion information list includes a first processing unit, a second processing unit, a filling unit, and a storage unit.

Specifically, the first processing unit is configured to traverse all neighboring image blocks of a current image block in a first preset order, to generate a candidate motion information list including at least one candidate motion information set, where the candidate motion information set includes candidate motion information of x control points of the current image block, the candidate motion information list is stored in the storage unit, and x is an integer greater than or equal to 2. The second processing unit is configured to: after the first processing unit traverses all the neighboring image blocks of the current image block, sequentially traverse at least two extra to be selected motion information sets in a second preset order, and store, in the candidate motion information list, an extra to be selected motion information set that satisfies a preset condition, until a quantity of candidate motion information sets in the candidate motion information list is equal to a preset quantity value or all the extra to be selected motion information sets are traversed, where the extra to be selected motion information set includes extra to be selected motion information of at least two control points of the current image block, and the extra to be selected motion information of the control point is motion information of an inter-coded image block adjacent to the current image block. Reference frame indexes of all control points in the extra to be selected motion information set that satisfies the preset condition are the same; or reference frame indexes of all control points in the extra to be selected motion information set that satisfies the preset condition are the same and extra to be selected motion vectors of at least two control points in the extra to be selected motion information set that satisfies the preset condition are different. The filling unit is configured to: if a quantity of candidate motion information sets in the candidate motion information list is less than the preset quantity value after the second processing unit traverses all the extra to be selected motion information sets, fill the candidate motion information list with a third preset candidate motion information set until the quantity of candidate motion information sets in the candidate motion information list is equal to the preset quantity value.

Optionally, in a possible implementation of this application, the extra to be selected motion information set includes at least extra to be selected motion information of a first control point and extra to be selected motion information of a second control point, where the first control point and the second control point are neighboring control points of the current image block.

For specific descriptions of any one of the eighth aspect or the possible implementations thereof in this application, refer to the detailed descriptions of any one of the third aspect or the possible implementations thereof. In addition, for beneficial effects of any one of the eighth aspect or the possible implementations thereof, refer to analysis on the beneficial effects of any one of the third aspect or the possible implementations thereof. Details are not described herein again.

According to a ninth aspect, an inter prediction apparatus is provided. The inter prediction apparatus includes an obtaining unit and a determining unit.

Specifically, the obtaining unit is configured to obtain and parse a bitstream, to obtain a first index value and a motion information difference, where the first index value is an index value of a motion information predictor of a control point of a current image block in a candidate motion information list, and the candidate motion information list is generated by the construction apparatus in any one of the sixth aspect, the seventh aspect, the eighth aspect, or the possible implementations thereof by using the construction method in any one of the first aspect, the second aspect, the third aspect, or the possible implementations thereof. The obtaining unit is further configured to obtain the motion information predictor of the control point from the candidate motion information list based on the first index value. The determining unit is configured to determine motion information of the control point based on the motion information predictor of the control point and the motion information difference that are obtained by the obtaining unit. The determining unit is further configured to determine prediction pixels of the current image block based on the motion information of the control point.

For specific descriptions of the ninth aspect in this application, refer to the detailed descriptions of the fourth aspect. In addition, for beneficial effects of the ninth aspect, refer to analysis on the beneficial effects of the fourth aspect. Details are not described herein again.

According to a tenth aspect, an inter prediction apparatus is provided. The inter prediction apparatus includes an obtaining unit and a determining unit.

The obtaining unit is configured to obtain and parse a bitstream, to obtain a second index value, where the second index value is an index value of motion information of a control point of a current image block in a candidate motion information list, and the candidate motion information list is generated by the construction apparatus in any one of the sixth aspect, the seventh aspect, the eighth aspect, or the possible implementations thereof by using the construction method in any one of the first aspect, the second aspect, the third aspect, or the possible implementations thereof. The obtaining unit is further configured to obtain the motion information of the control point from the candidate motion information list based on the second index value. The determining unit is configured to determine prediction pixels of the current image block based on the motion information of the control point that is obtained by the obtaining unit.

For specific descriptions of the tenth aspect in this application, refer to the detailed descriptions of the fifth aspect. In addition, for beneficial effects of the tenth aspect, refer to analysis on the beneficial effects of the fifth aspect. Details are not described herein again.

According to an eleventh aspect, a terminal is provided. The terminal includes one or more processors, a memory, and a communications interface. The memory and the communications interface are coupled to the one or more processors. The memory is configured to store computer program code. The computer program code includes an instruction. When the one or more processors execute the instruction, the terminal performs the method for constructing a candidate motion information list in any one of the first aspect, the second aspect, the third aspect, or the possible implementations thereof, or performs the inter prediction method in any one of the fourth aspect, the fifth aspect, or the possible implementations thereof.

According to a twelfth aspect, a video decoder is provided, including a non-volatile storage medium and a central processing unit. The non-volatile storage medium stores an executable program. The central processing unit is connected to the non-volatile storage medium, and performs the method for constructing a candidate motion information list in any one of the first aspect, the second aspect, the third aspect, or the possible implementations thereof, or performs the inter prediction method in any one of the fourth aspect, the fifth aspect, or the possible implementations thereof.

According to a thirteenth aspect, a decoder is provided. The decoder includes the apparatus for constructing a candidate motion information list in any one of the sixth aspect, the seventh aspect, the eighth aspect, or the possible implementations thereof, the inter prediction apparatus in any one of the ninth aspect, the tenth aspect, or the possible implementations thereof, and a reconstruction module. The reconstruction module is configured to determine a reconstructed pixel value of a current image block based on a prediction pixel obtained by the inter prediction apparatus.

According to a fourteenth aspect, a computer-readable storage medium is provided. The computer-readable storage medium stores an instruction. When the instruction is run on the terminal in the eleventh aspect, the terminal is enabled to perform the method for constructing a candidate motion information list in any one of the first aspect, the second aspect, the third aspect, or the possible implementations thereof, or perform the inter prediction method in any one of the fourth aspect, the fifth aspect, or the possible implementations thereof.

According to a fifteenth aspect, a computer program product including an instruction is provided. When the computer program product runs on the terminal in the eleventh aspect, the terminal is enabled to perform the method for constructing a candidate motion information list in any one of the first aspect, the second aspect, the third aspect, or the possible implementations thereof, or perform the inter prediction method in any one of the fourth aspect, the fifth aspect, or the possible implementations thereof.

In this application, names of the apparatus for constructing a candidate motion information list and the inter prediction apparatus impose no limitation on devices or functional modules. In actual implementation, the devices or the functional modules may have other names. Provided that functions of the devices or the functional modules are similar to those in this application, the devices or the functional modules fall within the scope of the claims in this application and their equivalent technologies.

For specific descriptions of the eleventh aspect to the fifteenth aspect and the possible implementations thereof in this application, refer to the detailed descriptions of any one of the first aspect, the second aspect, the third aspect, the fourth aspect, the fifth aspect, or the possible implementations thereof. In addition, for beneficial effects of the eleventh aspect to the fifteenth aspect and the possible implementations thereof, refer to analysis on the beneficial effects of any one of the first aspect, the second aspect, the third aspect, the fourth aspect, the fifth aspect, or the possible implementations thereof. Details are not described herein again.

These aspects or other aspects in this application are more concise and comprehensible in the following descriptions.

DESCRIPTION OF EMBODIMENTS

Figure 1:
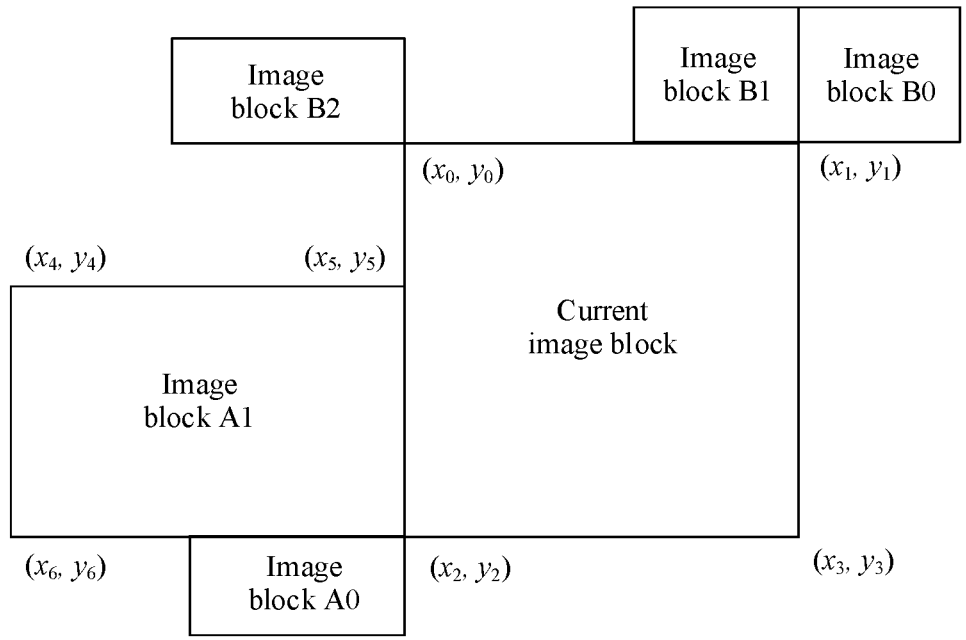
FIG. 1 is a diagram showing a principle of an inherited control point motion vector prediction method according to an embodiment of this application.

In the embodiments of this application, the word "example" or "for example" is used to represent giving an example, an illustration, or a description. Any embodiment or design scheme described as an "example" or "for example" in the embodiments of this application should not be explained as being more preferred or having more advantages than another embodiment or design scheme. Exactly, use of the word "example", "for example", or the like is intended to present a related concept in a specific manner.

To facilitate understanding of the embodiments of this application, related elements in the embodiments of this application are first described herein.

Image encoding (image encoding): a process of compressing an image sequence into a bitstream.

Image decoding (image decoding): a process of restoring a bitstream to a reconstructed image according to a specific syntax rule and a specific processing method.

Currently, a video image encoding process is as follows: An encoder side first splits a frame of original image into a plurality of parts that do not overlap each other, where each part may be used as an image block. Then, the encoder side performs operations such as prediction (prediction), transform (transform), and quantization (quantization) on each image block, to obtain a bitstream corresponding to the image block, where prediction is performed to obtain a prediction block of the image block, so that only a difference (or referred to as a residual or a residual block) between the image block and the prediction block of the image block may be encoded and transmitted, to reduce transmission overheads. Finally, the encoder side sends the bitstream corresponding to the image block to a decoder side.

Correspondingly, after receiving the bitstream, the decoder side performs a video decoding process. Specifically, the decoder side performs operations such as prediction, inverse quantization, and inverse transform on the received bitstream to obtain a reconstructed image block (or referred to as an image block after reconstruction). This process is referred to as an image reconstruction process (or an image rebuilding process). Then, the decoder side assembles a reconstructed block of each image block in the original image to obtain a reconstructed image of the original image, and plays the reconstructed image.

An existing video image coding technology includes intra prediction and inter prediction. Inter prediction is prediction completed by coding image block/decoding image block by using a correlation between a current frame and a reference frame of the current frame. The current frame may have one or more reference frames. Specifically, a prediction image block of a current image block is generated based on pixels in a reference frame of the current image block.

Generally, the prediction image block of the current image block may be generated based on only one reference image block, or the prediction image block of the current image block may be generated based on at least two reference image blocks Generating the prediction image block of the current image block based on one reference image block is referred to as unidirectional prediction, and generating the prediction image block of the current image block based on at least two reference image blocks is referred to as bidirectional inter prediction. The at least two reference image blocks in bidirectional inter prediction may be from a same reference frame or different reference frames. In other words, a "direction" in this application is a generalized definition. One direction in this application corresponds to one reference image block.

Motion compensation (motion compensation, MC) is a process of predicting the current image block by using a reference image block.

In most coding frameworks, a video sequence includes a series of images (picture), an image is split into at least one slice (slice), and each slice is further split into image blocks (block). Video encoding/decoding is performed by image block. Encoding/decoding may be performed from left to right and from top to bottom row by row starting from the top-left location of the image. Herein, the image block may be a block included in a coding unit (coding unit, CU) in the high efficiency video coding (High Efficiency Video Coding, HEVC) standard. For example, the image block may be a luminance block in the CU, or may be a chrominance block in the CU. This is not specifically limited in the embodiments of this application.

In this application, an image block that is being encoded/decoded is referred to as the current image block (current block), and an image in which the current image block is located is referred to as the current frame.

In the current frame, a neighboring image block (for example, on the left, top, or right side of the current block) of the current image block may have been encoded/decoded, and a reconstructed image is obtained. The neighboring image block is referred to as the reconstructed image block. Information such as a coding mode and a reconstructed pixel of the reconstructed image block is available (available).

A frame that has been encoded/decoded before the current frame is encoded/decoded is referred to as a reconstructed frame.

A motion vector (motion vector, MV) is an important parameter in an inter prediction process, and represents a spatial displacement of an encoded image block relative to the current image block. Usually, the motion vector may be obtained by using a motion estimation (motion estimation, ME) method such as motion search. In a preliminary inter prediction technology, the encoder side transmits a motion vector of the current image block in the bitstream, so that the decoder side reproduces prediction pixels of the current image block, to obtain a reconstructed block. To further improve encoding efficiency, a method for differentially encoding the motion vector by using a reference motion vector is provided. To be specific, only a motion vector difference (motion vector difference, MVD) is encoded.

To enable the decoder side and the encoder side to use a same reference image block, the encoder side needs to send, in the bitstream, motion information of each image block to the decoder side. If the encoder side directly encodes a motion vector of each image block, a large quantity of transmission resources are consumed. Because motion vectors of spatially neighboring image blocks are strongly correlated, the motion vector of the current image block can be predicted based on a motion vector of a neighboring encoded image block. A motion vector obtained through prediction is referred to as an MVP, and a difference between the motion vector of the current image block and the MVP is referred to as the MVD.

In the video coding standard H.264, multi-reference frame prediction is used in a motion estimation process to improve prediction accuracy. To be specific, a buffer storing a plurality of reconstructed frames is created, and all the reconstructed frames in the buffer are searched for an optimal reference image block for motion compensation, to better remove redundancy in time domain. In the video coding standard H.264, two buffers are used in inter prediction: a reference frame list 0 (reference list 0) and a reference frame list 1 (reference list 1). A reference frame in which an optimal reference block in each list is located is marked with an index value, namely, ref_idx_l0 and ref_idx_l1. In each reference frame list, motion information of a reference image block includes a reference frame index value (ref_idx_l0 or ref_idx_l1), an index value of an MVP in a candidate motion information list, and an MVD. The decoder side may find a correct reference image block in a selected reference frame based on the reference frame index value, the index value of the MVP in the candidate motion information list, and the MVD.

Currently, inter prediction modes frequently used in the HEVC standard are an advanced motion vector prediction (advanced motion vector prediction, AMVP) mode and a merge (merge) mode.

In the AMVP mode, the encoder side constructs the candidate motion information list by using a motion vector of an encoded image block that is spatially or temporally adjacent to the current image block, and determines an optimal motion vector in the candidate motion information list as the MVP of the current image block based on a rate-distortion cost. In addition, the encoder side performs motion search in a neighborhood centered on the MVP to obtain the motion vector of the current image block. The encoder side transmits the index value of the MVP in the candidate motion information list, the reference frame index value, and the MVD to the decoder side.

In the merge mode, the encoder side constructs the candidate motion information list by using the motion vector of the encoded image block that is spatially or temporally adjacent to the current image block, and determines the optimal motion vector in the candidate motion information list as the MV of the current image block based on the rate-distortion cost. The encoder side transmits an index value of a location of the optimal motion vector in the candidate motion information list to the decoder side.

In an existing video coding standard, a translational motion model-based motion compensation technology is used, and it is assumed that motion of all samples in an image block is consistent. However, in the real world, many objects, for example, a rotating object, a roller coaster rotating in different directions, fireworks, and some stunts in movies, are not in translational motion. If the translational motion model-based motion compensation technology in the existing coding standard is used for these moving objects, coding efficiency is greatly affected. Therefore, studies on a non-translational motion model have been carried out in the industry.

In a non-translational motion model prediction mode, an encoder/decoder side derives motion information of all subblocks of the current image block by using a same motion model, and performs motion compensation based on the motion information of all the subblocks to obtain the prediction image block. This improves prediction efficiency. A motion model frequently used by the encoder/decoder side is a 4-parameter affine motion model or a 6-parameter affine motion model.

For example, the 4-parameter affine motion model may be represented by using motion vectors of two samples and coordinates of the two samples relative to a pixel in the top-left corner of the current image block. Herein, a sample used to represent a motion model parameter is referred to as a control point. If the sample in the top-left corner (0, 0) of the current image block and a sample in the top-right corner (W, 0) of the current image block are control points, and motion vectors of the top-left corner and the top-right corner of the current image block are $(vx_0, vy_0)$ and $(vx_1, vy_1)$ respectively, motion information of each subblock of the current image block is obtained according to the following formula (1). In the following formula (1), (x, y) is coordinates of the subblock relative to the pixel in the top-left corner of the current image block, (vx, vy) is a motion vector of the subblock, and W is the width of the current image block.

$$\begin{cases} vx = \dfrac{vx_1 - vx_0}{W}x - \dfrac{vy_1 - vy_0}{W}y + vx_0 \\ vy = \dfrac{vy_1 - vy_0}{W}x + \dfrac{vx_1 - vx_0}{W}y + vy_0 \end{cases} \quad (1)$$

For example, the 6-parameter affine motion model may be represented by using motion vectors of three samples and coordinates of the three samples relative to the pixel in the top-left corner of the current image block. If the sample in the top-left corner (0, 0) of the current image block, the sample in the top-right corner (W, 0) of the current image block, and a sample in the bottom-left corner (0, H) of the current image block are control points, and motion vectors of the top-left corner, the top-right corner, and the bottom-left corner of the current image block are $(vx_0, vy_0)$, $(vx_1, vy_1)$, and $(vx_2, vy_2)$ respectively, the motion information of each subblock of the current image block is obtained according to the following formula (2). In the following formula (2), (x, y) is the coordinates of the subblock relative to the pixel in the top-left corner of the current image block, (vx, vy) is the motion vector of the subblock, W and H are the width and the height of the current image block respectively.

$$\begin{cases} vx = \dfrac{vx_1 - vx_0}{W}x + \dfrac{vx_2 - vy_0}{H}y + vx_0 \\ vy = \dfrac{vy_1 - vy_0}{W}x + \dfrac{vy_2 - vx_0}{H}y + vy_0 \end{cases} \quad (2)$$

For ease of description, in the embodiments of this application, an image block predicted by using the non-translational motion model prediction mode is referred to as an affine coding block. Certainly, this type of image block may alternatively be represented by using another name. This is not specifically limited in the embodiments of this application.

It can be learned from the foregoing description of the non-translational motion model prediction mode that motion information of a control point of the affine coding block needs to be obtained in a prediction process.

Usually, the encoder/decoder side may obtain motion information of a control point by using an affine advanced motion vector prediction mode (Affine AMVP mode) or an affine merge mode (Affine Merge mode).

A process in which the encoder/decoder side uses the affine AMVP mode to obtain motion information of a control point of the current image block is as follows:

Step 1: The encoder/decoder side constructs a control point candidate motion information list.

The encoder/decoder side constructs the candidate motion information list by using an inherited control point motion vector prediction method (referring to the following description) and/or a constructed control point motion vector prediction method (referring to the following description).

The candidate motion information list includes a plurality of candidate motion information sets, and each piece of candidate motion information set may include motion vectors of two (4-parameter affine model) or three (6-parameter affine model) control points.

Optionally, the encoder/decoder side prunes and sorts the candidate motion information list according to a preset rule, and may truncate or fill the candidate motion information list to obtain candidate motion information sets of a particular quantity (corresponding to a subsequently preset quantity value).

Step 2: The encoder/decoder side determines an optimal candidate motion information set, and uses the optimal candidate motion information as a motion information predictor of the control point.

The encoder side uses each candidate motion information set in the candidate motion information list to obtain a motion vector of each subblock of the current image block according to the foregoing formula (1)/(2), obtains a pixel value of a corresponding location in a reference frame to which the motion vector of each subblock points, and uses the pixel value as a pixel predictor of the subblock to perform affine transform motion compensation. The encoder side calculates an average value of differences between original values and predictors of all samples in the current image block, and selects, as the optimal candidate motion information set, a candidate motion information set corresponding to a minimum average value. The encoder side sends an index number of the optimal candidate motion information set in the candidate motion information list to the decoder side.

The decoder side parses the index number, and determines the motion information predictor of the control point (control point motion vector predictor, CPMVP) in the candidate motion information list based on the index number.

Step 3: The encoder/decoder side determines a motion vector of the control point.

The encoder side uses a motion vector in the motion information predictor of the control point (referred to as a motion vector predictor of the control point) as a search start point to perform motion search within a specific range to obtain the motion vector of the control point (control point motion vector, CPMV), and transmits a difference (control point motion vectors difference, CPMVD) between the motion vector of the control point and the motion vector predictor of the control point to the decoder side.

The decoder side parses the motion vector difference of the control point, and adds the motion vector difference of the control point and the motion vector predictor of the control point to obtain the motion vector of the control point.

A process in which the encoder/decoder side uses the affine merge mode to obtain a motion vector of a control point of the current image block is as follows:

Step I: The encoder/decoder side constructs a control point candidate motion information list.

The encoder/decoder side constructs the control point candidate motion information list by using an inherited control point motion vector prediction method and/or a constructed control point motion vector prediction method.

Optionally, the encoder/decoder side prunes and sorts the control point candidate motion information list according to a preset rule, and may truncate or fill the control point candidate motion information list to obtain candidate motion information sets of a particular quantity (corresponding to a subsequently preset quantity value).

Step II: The encoder/decoder side determines motion information of the control point.

The encoder side uses each candidate motion information set in the candidate motion information list to obtain motion information of each subblock of the current image block according to the foregoing formula (1)/(2), obtains a pixel value of a location in a reference frame to which the motion information of each subblock points, and uses the pixel value as a pixel predictor of the subblock to perform affine motion compensation. The encoder side calculates an average value of differences between original values and predictors of all samples in the current coding block, and selects, as the motion information of the control point of the current image block, a candidate motion information set corresponding to a minimum average value. The encoder side sends an index value of the motion information of the control point in the candidate motion information list to the decoder side.

The decoder side parses the bitstream to obtain the index value of the motion information of the control point in the candidate motion information list, and determines the motion information of the control point in the candidate motion information list based on the index value.

It can be learned from the foregoing description that the encoder/decoder side may construct the candidate motion information list by using the inherited control point motion vector prediction method (inherited control point motion vectors) and/or the constructed control point motion vector prediction method (constructed control point motion vectors). The following separately describes the inherited control point motion vector prediction method and the constructed control point motion vector prediction method.

In the inherited control point motion vector prediction method, an encoder/decoder side derives a motion vector of a control point of a current image block by using a motion model of an encoded affine coding block that is spatially adjacent to the current image block.

For example, as shown in FIG. 1, if an image block B2, an image block B1, an image block B0, an image block A1, and an image block A0 are spatially adjacent to the current image block, the encoder/decoder side traverses (checking in sequence) the spatially neighboring image blocks of the current image block in a preset order, for example, an order of the image block A1, the image block B1, the image block B0, the image block A0, and then the image block B2, to determine an affine coding block in the spatially neighboring image blocks, obtains a motion vector of a control point of the affine coding block, and derives the motion vector of the control point of the current image block or a motion vector predictor of the control point of the current image block based on a motion model used for the affine coding block.

For ease of understanding, with reference to FIG. 1, the inherited control point motion vector prediction method is described by using an example in which the image block A1 is the affine coding block. As shown in FIG. 1, if a sample in the top-left corner $(x_0, y_0)$ of the current image block and a sample in the top-right corner $(x_1, y_1)$ of the current image block are control points, motion vectors of the top-left corner and the top-right corner of the current image block are $(vx_0, vy_0)$ and $(vx_1, vy_1)$ respectively.

If the image block A1 is a 4-parameter affine coding block, a sample in the top-left corner $(x_4, y_4)$ of the image block A1 and a sample in the top-right corner $(x_5, y_5)$ of the image block A1 are control points, and motion vectors of the top-left corner and the top-right corner of the image block A1 are $(vx_4, vy_4)$ and $(vx_5, vy_5)$ respectively. The encoder/decoder side calculates the motion vector of the top-left corner of the current image block according to the following formula (3), and calculates the motion vector of the top-right corner of the current image block according to the following formula (4). In other words, the motion vector of the control point of the current image block is calculated based on a 4-parameter affine motion model.

$$\begin{cases} vx_0 = vx_4 + \frac{(vx_5 - vx_4)}{x_5 - x_4} \times (x_0 - x_4) - \frac{(vy_5 - vy_4)}{x_5 - x_4} \times (y_0 - y_4) \\ vy_0 = vy_4 + \frac{(vy_5 - vy_4)}{x_5 - x_4} \times (x_0 - x_4) + \frac{(vx_5 - vx_4)}{x_5 - x_4} \times (y_0 - y_4) \end{cases} \quad (3)$$

$$\begin{cases} vx_1 = vx_4 + \frac{(vx_5 - vx_4)}{x_5 - x_4} \times (x_1 - x_4) - \frac{(vy_5 - vy_4)}{x_5 - x_4} \times (y_1 - y_4) \\ vy_1 = vy_4 + \frac{(vy_5 - vy_4)}{x_5 - x_4} \times (x_1 - x_4) + \frac{(vx_5 - vx_4)}{x_5 - x_4} \times (y_1 - y_4) \end{cases} \quad (4)$$

If a sample in the top-left corner $(x_0, y_0)$ of the current image block, a sample in the top-right corner $(x_1, y_1)$ of the current image block, and a sample in the bottom-left corner $(x_2, y_2)$ of the current image block are control points, motion vectors of the top-left corner, the top-right corner, and the bottom-left corner of the current image block are $(vx_0, vy_0)$, $(vx_1, a\ vy_1)$, and $(vx_2, vy_2)$ respectively.

If the image block A1 is a 6-parameter affine coding block, a sample in the top-left corner $(x_4, y_4)$ of the image block A1, a sample in the top-right corner $(x_5, y_5)$ of the image block A1, and a sample in the bottom-left corner $(x_6, y_6)$ of the image block A1 are control points, and motion vectors of the top-left corner, the top-right corner, and the bottom-left corner of the image block A1 are $(vx_4, vy_4)$, $(vx_5, vy_5)$, and $(vx_6, vy_6)$ respectively. The encoder/decoder side calculates the motion vector of the top-left corner of the current image block according to the following formula (5), calculates the motion vector of the top-right corner of the current image block according to the following formula (6), and calculates the motion vector of the bottom-left corner of the current image block according to the following formula (7). In other words, the motion vector of the control point of the current image block is calculated based on a 6-parameter affine motion model.

$$\begin{cases} vx_0 = vx_4 + \frac{(vx_5 - vx_4)}{x_5 - x_4} \times (x_0 - x_4) + \frac{(vx_6 - vx_4)}{y_6 - y_4} \times (y_0 - y_4) \\ vy_0 = vy_4 + \frac{(vy_5 - vy_4)}{x_5 - x_4} \times (x_0 - x_4) + \frac{(vy_6 - vy_4)}{y_6 - y_4} \times (y_0 - y_4) \end{cases} \quad (5)$$

$$\begin{cases} vx_1 = vx_4 + \frac{(vx_5 - vx_4)}{x_5 - x_4} \times (x_1 - x_4) + \frac{(vx_6 - vx_4)}{y_6 - y_4} \times (y_1 - y_4) \\ vy_1 = vy_4 + \frac{(vy_5 - vy_4)}{x_5 - x_4} \times (x_1 - x_4) + \frac{(vy_6 - vy_4)}{y_6 - y_4} \times (y_1 - y_4) \end{cases} \quad (6)$$

$$\begin{cases} vx_2 = vx_4 + \frac{(vx_5 - vx_4)}{x_5 - x_4} \times (x_2 - x_4) + \frac{(vx_6 - vx_4)}{y_6 - y_4} \times (y_2 - y_4) \\ vy_2 = vy_4 + \frac{(vy_5 - vy_4)}{x_5 - x_4} \times (x_2 - x_4) + \frac{(vy_6 - vy_4)}{y_6 - y_4} \times (y_2 - y_4) \end{cases} \quad (7)$$

Certainly, the encoder/decoder side may alternatively calculate the motion vector of the control point of the current image block by using a motion model other than the 4-parameter affine motion model and the 6-parameter affine motion model.

In the constructed control point motion vector prediction method, an encoder/decoder side combines motion vectors of encoded image blocks that are spatially/temporally adjacent to a control point of a current image block to obtain a candidate motion vector of the control point of the current image block, and does not need to consider whether the encoded spatially/temporally neighboring image blocks are affine coding blocks.

The constructed control point motion vector prediction method can be implemented in the following two manners.

In a first implementation, the encoder/decoder uses, as candidate motion vectors of the control point of the current image block, the motion vectors of the encoded image blocks that are spatially/temporally adjacent to the current image block. Then, the encoder/decoder side selects an optimal candidate motion vector from the candidate motion vectors of the control point as a motion vector of the control point.

Figure 2:
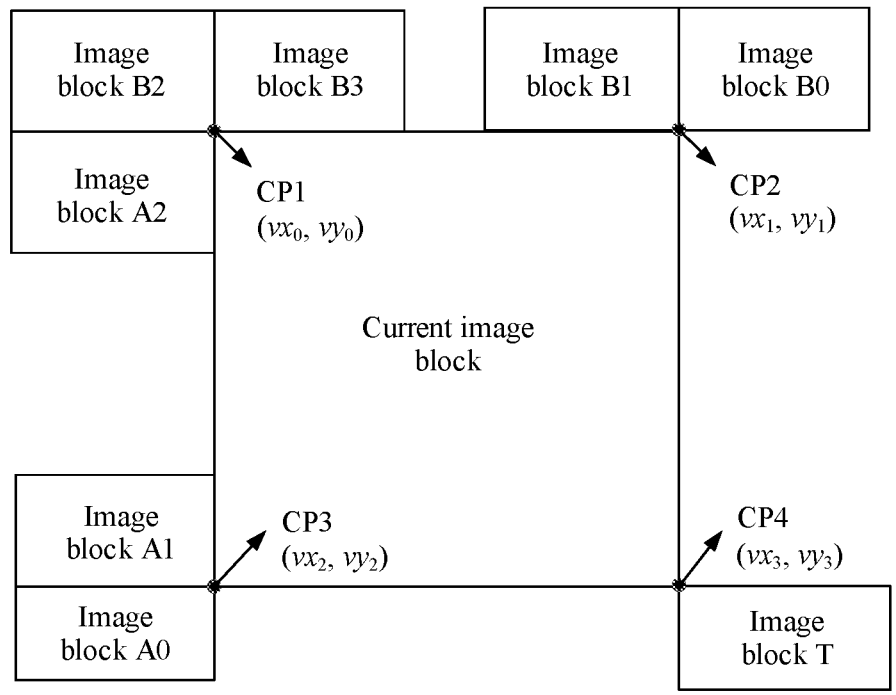
FIG. 2 is a diagram showing a principle of a constructed control point motion vector prediction method according to an embodiment of this application.

For example, as shown in FIG. 2, the top-left corner and the top-right corner of the current image block are control points of the current image block. If encoded image blocks adjacent to the top-left corner of the current image block are an image block A2, an image block B2, and an image block B3, and encoded image blocks adjacent to the top-right corner of the current image block are an image block B0 and an image block B1, the encoder/decoder side uses a motion vector $v_{A2}$ of the image block A2, a motion vector $v_{B2}$ of the image block B2, and a motion vector $v_{B3}$ of the image block B3 as candidate motion vectors of the top-left corner of the current image block, and a motion vector $v_{B0}$ of the image block B0 and a motion vector $v_{B1}$ of the image block B1 as candidate motion vectors of the top-right corner of the current image block. Then, the encoder/decoder side combines each of the candidate motion vectors of the top-left corner of the current image block and each of the candidate motion vectors of the top-right corner of the current image block, to generate a candidate motion vector 2-tuple queue of the two control points: $\{(v_{A2}, v_{B1}), (v_{A2}, v_{B0}), (v_{B2}, v_{B1}), (v_{B2}, v_{B0}), (v_{B3}, v_{B1}), (v_{B3}, v_{B0})\}$. Then, the encoder/decoder side may select an optimal candidate motion vector from the candidate motion vector 2-tuple queue as the motion vector of the control point of the current image block.

In a second implementation, the encoder/decoder side first calculates an extra to be selected motion vector of each control point of the current image block. Then, the encoder/decoder side combines the motion vector of each control point by using a non-translational motion model, to generate a candidate motion information list. Finally, the encoder/decoder side selects optimal candidate motion information from the candidate motion information list as motion information of the control point of the current image block.

For example, as shown in FIG. 2, in the embodiments of this application, CPk (k=1, 2, 3, 4) is used to represent the $k^{th}$ control point of the current image block, and coordinates of CP1, CP2, CP3, and CP4 are (0, 0), (W, 0), (0, H), and (W, H), respectively, where W and H are the width and the height of the current image block respectively. An image block A2, an image block B2, an image block B3, an image block B0, and an image block B1 are all spatially adjacent to the current image block, and may be used to predict CP1, CP2, or CP3. An image block T is temporally adjacent to the current image block, and may be used to predict CP4.

Step A: The encoder/decoder side obtains the extra to be selected motion vector of each control point of the current image block in the following order:

For CP1, the encoder/decoder side sequentially checks the image block B2, the image block A2, and the image block B3. If the image block B2 is obtained through inter coding, the encoder/decoder side uses a motion vector of the image block B2 as an extra to be selected motion vector vcp1 of CP1. If the image block B2 is not obtained through inter coding, the encoder/decoder side sequentially detects the image block A2 and the image block B3. If none of the image block B2, the image block A2, and the image block B3 is obtained through inter coding, the encoder/decoder side cannot determine the extra to be selected motion vector of CP1.

For CP2, the encoder/decoder side sequentially queries the image block B0 and the image block B1, and determines an extra to be selected motion vector vcp2 of CP2 based on a query result.

For CP3, the encoder/decoder side sequentially queries the image block A0 and the image block A1, and determines an extra to be selected motion vector vcp3 of CP3 based on a query result.

For CP4, the encoder/decoder side uses a motion vector of the image block T as an extra to be selected motion vector vcp4 of CP4.

Step B: The encoder/decoder side combines the extra to be selected motion vectors of the foregoing control points, to generate a control point candidate motion information list.

Specifically, the encoder/decoder side combines extra to be selected motion vectors of any two control points, to construct a 4-parameter affine motion model. The extra to be selected motion vectors of the two control points may be combined as follows: (vcp1, vcp4), (vcp2, vcp3), (vcp1, vcp2), (vcp2, vcp4), (vcp1, vcp3), and (vcp3, vcp4). For example, in the embodiments of this application, the 4-parameter affine motion model constructed by using vcp1 and vcp2 is denoted as Affine (vcp1, vcp2).

The encoder/decoder side combines extra to be selected motion vectors of any three control points, to construct a 6-parameter affine motion model. The extra to be selected motion vectors of the three control points may be combined as follows: (vcp1, vcp2, vcp4), (vcp1, vcp2, vcp3), (vcp2, vcp3, vcp4), and (vcp1, vcp3, vcp4). For example, in the embodiments of this application, the 6-parameter affine motion model constructed by using vcp1, vcp2, and vcp3 is denoted as Affine (vcp1, vcp2, vcp3).

The encoder/decoder side combines the extra to be selected motion vectors of the foregoing four control points, to construct an 8-parameter affine motion model. For example, in the embodiments of this application, the 8-parameter affine motion model model constructed by using vcp1, vcp2, vcp3, and vcp4 is denoted as Bilinear (vcp1, vcp2, vcp3, vcp4).

In an actual application, the encoder/decoder side performs traversal in the foregoing order. If an extra to be selected motion vector in a set cannot be obtained, the encoder/decoder side cannot determine the set. Otherwise, the encoder/decoder side determines reference frame indexes of all control points in the set, and scales an extra to be selected motion vector in the set according to the following formula (8). Further, if all extra to be selected motion vectors obtained after scaling are consistent, the set obtained by the encoder/decoder side is invalid. Otherwise, the encoder/decoder side adds the set to the candidate motion information list.

In other words, the encoder/decoder side first preliminarily calculates an extra to be selected motion vector of each control point, and combines obtained extra to be selected motion vectors in the foregoing order. If reference frame indexes of extra to be selected motion vectors in a set are inconsistent, the encoder/decoder side scales the extra to be selected motion vectors in the set. If extra to be selected motion vectors obtained after scaling are consistent, the encoder/decoder side adds the set to the candidate motion information list.

$$MV_s = \frac{CurPoc - DesPoc}{CurPoc - SrcPoc} \times MV \quad (8)$$

In the formula (8), CurPoc represents a sequence number of a current frame, DesPoc represents a sequence number of a reference frame of the current image block, SrcPoc represents a sequence number of a reference frame of a control point, $MV_s$ represents an MV obtained after scaling.

It should be noted that sets of extra to be selected motion vectors of the foregoing different control points may be mutually converted.

For example, the encoder/decoder side may convert (vcp1, vcp2) into (vcp1, vcp2, vcp3) according to the following formula (9):

$$\begin{cases} vx_2 = -\frac{vy_1 - vy_0}{W} H + vx_0 \\ vy_2 = +\frac{vx_1 - vx_0}{W} H + vy_0 \end{cases} \quad (9)$$

vcp1 is specifically $(vx_0, vy_0)$, vcp2 is specifically $(vx_1, vy_1)$, and vcp3 is specifically $(vx_2, vy_2)$.

The encoder/decoder side may convert (vcp1, vcp3) into (vcp1, vcp2, vcp3) or (vcp1, vcp2) according to the following formula (10):

$$\begin{cases} vx_1 = +\frac{vy_2 - vy_0}{H} W + vx_0 \\ vy_1 = -\frac{vx_2 - vx_0}{H} W + vy_0 \end{cases} \quad (10)$$

The encoder/decoder side may convert (vcp2, vcp3) into (vcp1, vcp2, vcp3) or (vcp1, vcp2) according to the following formula (11):

$$\begin{cases} vx_0 = \dfrac{vx_2 - vx_1}{W*W + H*H} W*W - \dfrac{vy_2 - vy_1}{W*W + H*H} H*W + vx_1 \\ vy_0 = \dfrac{vy_2 - vy_1}{W*W + H*H} W*W + \dfrac{vx_2 - vx_1}{W*W + H*H} H*W + vy_1 \end{cases} \quad (11)$$

The encoder/decoder side may convert (vcp1, vcp4) into (vcp1, vcp2, vcp3) or (vcp1, vcp2) according to the following formulas (12) and (13):

$$\begin{cases} vx_1 = \dfrac{vx_3 - vx_0}{W*W + H*H} W*W + \dfrac{vy_3 - vy_0}{W*W + H*H} H*W + vx_0 \\ vy_1 = \dfrac{vy_3 - vy_0}{W*W + H*H} W*W - \dfrac{vx_3 - vx_0}{W*W + H*H} H*W + vy_0 \end{cases} \quad (12)$$

$$\begin{cases} vx_2 = \dfrac{vx_3 - vx_0}{W*W + H*H} H*H - \dfrac{vy_3 - vy_0}{W*W + H*H} H*W + vx_0 \\ vy_2 = \dfrac{vy_3 - vy_0}{W*W + H*H} W*H + \dfrac{vx_3 - vx_0}{W*W + H*H} H*H + vy_0 \end{cases} \quad (13)$$

vcp4 is specifically $(vx_3, vy_3)$.

The encoder/decoder side may convert (vcp2, vcp4) into (vcp1, vcp2, vcp3) or (vcp1, vcp2) according to the following formulas (14) and (15):

$$\begin{cases} vx_0 = -\dfrac{vy_3 - vy_1}{H} W + vx_1 \\ vy_0 = +\dfrac{vx_3 - vx_1}{H} W + vy_1 \end{cases} \quad (14)$$

$$\begin{cases} vx_2 = -\dfrac{vy_3 - vy_1}{H} W + vx_3 \\ vy_2 = +\dfrac{vx_3 - vx_1}{H} W + vy_3 \end{cases} \quad (15)$$

The encoder/decoder side may convert (vcp3, vcp4) into (vcp1, vcp2, vcp3) or (vcp1, vcp2) according to the following formulas (16) and (17):

$$\begin{cases} vx_0 = +\dfrac{vy_3 - vy_2}{W} H + vx_2 \\ vy_0 = -\dfrac{vx_3 - vx_2}{W} H + vy_2 \end{cases} \quad (16)$$

$$\begin{cases} vx_1 = +\dfrac{vy_3 - vy_2}{W} H + vx_3 \\ vy_1 = -\dfrac{vx_3 - vx_2}{W} H + vy_3 \end{cases} \quad (17)$$

The encoder/decoder side may convert (vcp1, vcp2, vcp4) into (vcp1, vcp2, vcp3) according to the following formula (18):

$$\begin{cases} vx_2 = vx_3 + vx_0 - vx_1 \\ vy_2 = vy_3 + vy_0 - vy_1 \end{cases} \quad (18)$$

The encoder/decoder side may convert (vcp2, vcp3, vcp4) into (vcp1, vcp2, vcp3) according to the following formula (19):

$$\begin{cases} vx_0 = vx_1 + vx_2 - vx_3 \\ vy_0 = vy_1 + vy_2 - vy_3 \end{cases} \quad (19)$$

The encoder/decoder side may convert (vcp1, vcp3, vcp4) into (vcp1, vcp2, vcp3) according to the following formula (20):

$$\begin{cases} vx_1 = vx_3 + vx_0 - vx_2 \\ vy_1 = vy_3 + vy_0 - vy_2 \end{cases} \quad (20)$$

In the prior art, a method used by an encoder/decoder side to construct a control point candidate motion information list is usually as follows: S1: The encoder/decoder side calculates candidate motion information of a plurality of control points of a current image block by using an inherited control point motion vector prediction method, and adds the candidate motion information to the candidate motion information list. S2: The encoder/decoder side calculates candidate motion information of the plurality of control points of the current image block by using a constructed control point motion vector prediction method, and adds the candidate motion information to the candidate motion information list. S3: If a quantity of candidate motion information sets in the candidate motion information list is less than a preset quantity value, the encoder/decoder side fills the candidate motion information list with a preset candidate motion information set until the quantity of candidate motion information sets in the candidate motion information list reaches the preset quantity value.

In S1 and S2, before adding a new candidate motion information set to the candidate motion information list each time, the encoder/decoder side first checks whether the same motion information set already exists in the candidate motion information list. If the same motion information set exists in the candidate motion information list, the encoder/decoder side does not add the new candidate motion information set to the list. This process is referred to as pruning of the candidate motion information list. Pruning of the candidate motion information list can prevent same motion information in the candidate motion information list, and avoid redundant rate-distortion cost calculation. However, calculation complexity of this process is also relatively high, and a delay is relatively long.

In addition, calculating candidate motion information of a control point by the encoder/decoder side by using the inherited control point motion vector prediction method is highly complex. When the candidate motion information of the control point is calculated by using the constructed control point motion vector prediction method, if reference frame indexes in an extra to be selected motion information set are inconsistent, the encoder/decoder side further needs to scale an extra to be selected motion vector. Calculation complexity of scaling is high, and this also increases the delay.

To resolve the foregoing problems, this application provides a method for constructing a candidate motion information list, and a corresponding construction apparatus. The method or the construction apparatus sequentially performs a first processing process on all neighboring image blocks of a current image block in a first preset order, until a quantity of candidate motion information sets in a candidate motion information list is equal to a first preset value or all the neighboring image blocks are traversed. After the quantity of candidate motion information sets in the candidate motion information list is equal to the first preset value or all the neighboring image blocks are traversed, the construction apparatus sequentially traverses at least two extra to be selected motion information sets in a second preset order, and stores, in the candidate motion information list, an extra to be selected motion information set that satisfies a preset condition, until the quantity of candidate motion information sets in the candidate motion information list is equal to a preset quantity value or all the extra to be selected motion information sets are traversed. Herein, the preset quantity value is greater than the first preset value, the extra to be selected motion information set includes extra to be selected motion information of at least two control points of the current image block, and the extra to be selected motion information of the control point is motion information of an inter-coded image block adjacent to the current image block. If a quantity of candidate motion information sets in the candidate motion information list is less than the preset quantity value after all the extra to be selected motion information sets are traversed, the construction apparatus fills the candidate motion information list with a first preset candidate motion information set until the quantity of candidate motion information sets in the candidate motion information list is equal to the preset quantity value.

Alternatively, the construction apparatus may sequentially perform a first processing process on all neighboring image blocks of a current image block in a first preset order, until a quantity of candidate motion information sets in a first candidate motion information list is equal to a first preset value or all the neighboring image blocks are traversed. In addition, the construction apparatus further sequentially traverses at least two extra to be selected motion information sets in a second preset order, and stores, in a second candidate motion information list, an extra to be selected motion information set that satisfies a preset condition, until a quantity of candidate motion information sets in the second candidate motion information list is equal to a second preset value or all the extra to be selected motion information sets are traversed. Then, the construction apparatus merges the first candidate motion information list and the second candidate motion information list according to a preset rule, to obtain a third candidate motion information list. A quantity of candidate motion information sets in the third candidate motion information list is equal to a preset quantity value. A sum of the first preset value and the second preset value is greater than or equal to the preset quantity value.

Alternatively, the construction apparatus may traverse all neighboring image blocks of a current image block in a first preset order, to generate a candidate motion information list including at least one candidate motion information set, where the candidate motion information set includes candidate motion information of x control points of the current image block, and x is an integer greater than or equal to 2. After traversing all the neighboring image blocks of the current image block, the construction apparatus sequentially traverses at least two extra to be selected motion information sets in a second preset order, and stores, in the candidate motion information list, an extra to be selected motion information set that satisfies a preset condition, until a quantity of candidate motion information sets in the candidate motion information list is equal to a preset quantity value or all the extra to be selected motion information sets are traversed. If a quantity of candidate motion information sets in the candidate motion information list is less than the preset quantity value after all the extra to be selected motion information sets are traversed, the construction apparatus fills the candidate motion information list with a third preset candidate motion information set until the quantity of candidate motion information sets in the candidate motion information list is equal to the preset quantity value.

Specifically, the first processing process is as follows: For the $i^{th}$ ($i \in [1, n]$) neighboring image block, when the $i^{th}$ neighboring image block is an affine coding block, the construction apparatus determines whether the $i^{th}$ neighboring image block and a candidate motion information set that has been stored in the candidate motion information list come from a same coding unit. If no candidate motion information set from the coding unit to which the $i^{th}$ neighboring image block belongs exists in the candidate motion information list, the construction apparatus determines candidate motion information of x control points of the current image block based on motion information of x control points of the $i^{th}$ neighboring image block, and stores, in the candidate motion information list, a candidate motion information set including the candidate motion information of the x control points of the current image block, where n is a quantity of neighboring image blocks of the current image block, and both x and n are integers greater than or equal to 2.

The extra to be selected motion information set includes the extra to be selected motion information of the at least two control points of the current image block, and the extra to be selected motion information of the control point is the motion information of the inter-coded image block adjacent to the current image block. Reference frame indexes of all control points in the extra to be selected motion information set that satisfies the preset condition are the same; or reference frame indexes of all control points in the extra to be selected motion information set that satisfies the preset condition are the same and extra to be selected motion vectors of at least two control points in the extra to be selected motion information set that satisfies the preset condition are different.

It can be learned that, in both the first processing process and a processing process of the extra to be selected motion information, whether to add a new candidate motion information set to the candidate motion information list is determined based on a determining result, and there is no need to first calculate the new candidate motion information set and then determine whether same motion information exists in the candidate motion information list. This effectively reduces calculation complexity and a delay.

In addition, this application further provides an inter prediction method. An inter prediction apparatus parses a bitstream, to obtain an index value (namely, a first index value) and a motion information difference, where the index value is an index value of a motion information predictor of a control point of a current image block in a candidate motion information list that is generated by a construction apparatus by using the foregoing construction method. In this way, the inter prediction apparatus obtains the motion information predictor of the control point from the candidate motion information list based on the first index value, determines motion information of the control point based on the motion information predictor of the control point and the motion information difference, and determines prediction pixels of the current image block based on the motion information of the control point.

Alternatively, the inter prediction apparatus may parse a bitstream, to obtain an index value (namely, a second index value) of motion information of a control point of a current image block in a candidate motion information list that is generated by a construction apparatus by using the foregoing construction method. In this way, the inter prediction apparatus obtains the motion information of the control point from the candidate motion information list based on the second index value, and determines prediction pixels of the current image block based on the motion information of the control point.

The construction method provided in this application effectively reduces calculation complexity and a delay. Therefore, inter prediction performed based on the candidate motion information list generated by using the construction method also effectively reduces the calculation complexity and the delay.

The method for constructing a candidate motion information list provided in this application may be performed by a construction apparatus, a video coding apparatus, a video codec, or another device having a video coding function. The inter prediction method provided in this application may be performed by an inter prediction apparatus, a video coding apparatus, a video codec, or another device having a video coding function. The construction apparatus and the inter prediction apparatus may be disposed in a same device, or may be disposed independently. This is not specifically limited in the embodiments of this application.

The method for constructing a candidate motion information list and the inter prediction method that are provided in this application are applicable to a video coding system. A video encoder 100 and a video decoder 200 in the video coding system are configured to generate a candidate motion information list according to an example of the method for constructing a candidate motion information list in this application, and predict a current image block.

Figure 3:
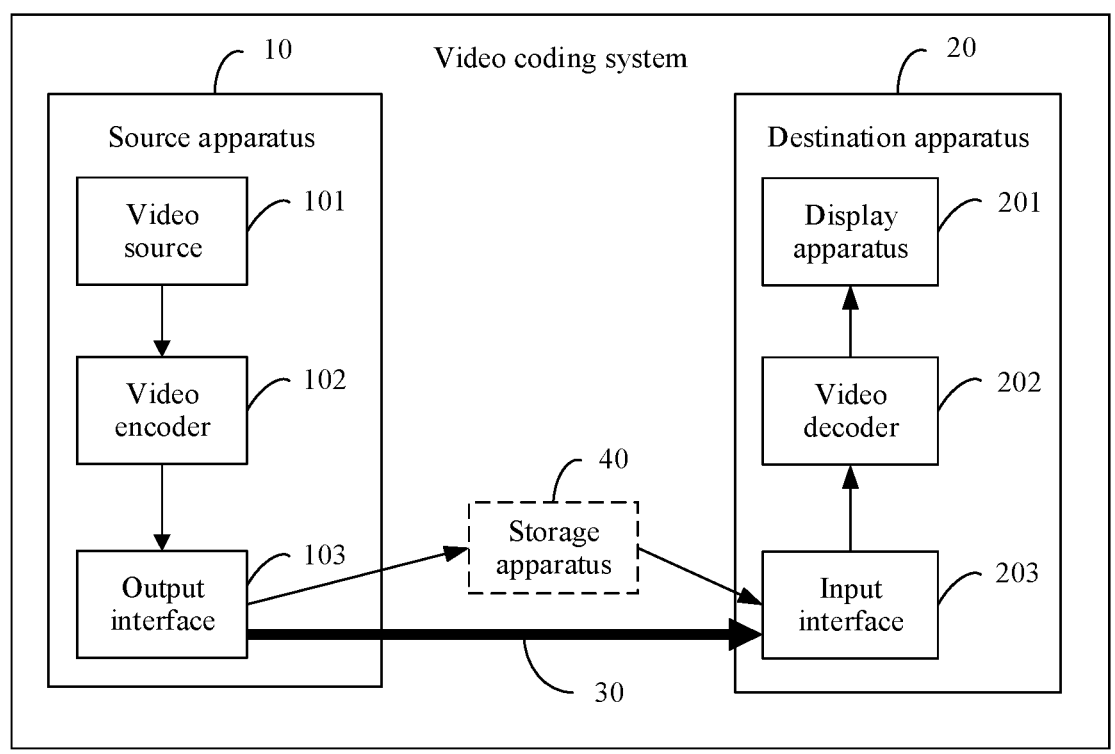
FIG. 3 is a schematic structural diagram of a video coding system according to an embodiment of this application.

FIG. 3 shows a structure of the video coding system. As shown in FIG. 3, the video coding system includes a source apparatus 10 and a destination apparatus 20. The source apparatus 10 generates encoded video data. The source apparatus 10 may also be referred to as a video encoding apparatus or a video encoding device. The destination apparatus 20 may decode the encoded video data generated by the source apparatus 10. The destination apparatus 20 may also be referred to as a video decoding apparatus or a video decoding device. The source apparatus 10 and/or the destination apparatus 20 may include at least one processor and a memory coupled to the at least one processor. The memory may include but is not limited to a read-only memory (read-only memory, ROM), a random access memory (random access memory, RAM), an electrically erasable programmable read-only memory (electrically erasable programmable read-only memory, EEPROM), a flash memory, or any other medium that may be configured to store required program code in a form of an instruction or a data structure and that can be accessed by a computer. This is not specifically limited in this application.

The source apparatus 10 and the destination apparatus 20 may include various apparatuses, including a desktop computer, a mobile computing apparatus, a notebook (for example, laptop) computer, a tablet computer, a set top box, a handheld telephone set such as a "smart" phone, a television set, a camera, a display apparatus, a digital media player, a video game console, a vehicle-mounted computer, or a similar apparatus.

The destination apparatus 20 may receive the encoded video data from the source apparatus 10 through a link 30. The link 30 may include one or more media and/or apparatuses that can transfer the encoded video data from the source apparatus 10 to the destination apparatus 20. In an example, the link 30 may include one or more communications media that enable the source apparatus 10 to directly transmit the encoded video data to the destination apparatus 20 in real time. In this example, the source apparatus 10 may modulate the encoded video data according to a communications standard (for example, a wireless communications protocol), and may transmit the modulated video data to the destination apparatus 20. The one or more communications media may include wireless and/or wired communications media, for example, a radio frequency (radio frequency, RF) spectrum, or one or more physical transmission cables. The one or more communications media may constitute a part of a packet-based network, and the packet-based network is, for example, a local area network, a wide area network, or a global network (for example, the internet). The one or more communications media may include a router, a switch, a base station, or another device implementing communication from the source apparatus 10 to the destination apparatus 20.

In another example, the encoded video data may be output to a storage apparatus 40 through an output interface 140. Similarly, the encoded video data may be accessed from the storage apparatus 40 through an input interface 240. The storage apparatus 40 may include a plurality of types of locally accessible data storage media such as a Blu-ray disc, a high-density digital video disc (digital video disc, DVD), a compact disc read-only memory (compact disc read-only memory, CD-ROM), a flash memory, or another appropriate digital storage medium configured to store the encoded video data.

In another example, the storage apparatus 40 may correspond to a file server, or another intermediate storage apparatus storing the encoded video data generated by the source apparatus 10. In this example, the destination apparatus 20 may obtain stored video data from the storage apparatus 40 through streaming transmission or downloading. The file server may be any type of server that can store the encoded video data and transmit the encoded video data to the destination apparatus 20. For example, the file server may include a world wide web (world wide web, Web) server (for example, used for a website), a file transfer protocol (file transfer protocol, FTP) server, a network attached storage (network attached storage, NAS) apparatus, and a local disk drive.

The destination apparatus 20 may access the encoded video data through any standard data connection (for example, an internet connection). An example type of the data connection includes a wireless channel or a wired connection (for example, a cable modem) that can be used to access the encoded video data stored in the file server, or a set thereof. Transmission of the encoded video data from the file server may be streaming transmission, download transmission, or a set thereof.

The method for constructing a candidate motion information list and the inter prediction method in this application are not limited to a wireless application scenario. For example, the method for constructing a candidate motion information list and the inter prediction method in this application may be applied to video coding for supporting a plurality of multimedia applications such as the following applications: over-the-air television broadcasting, cable television transmission, satellite television transmission, streaming video transmission (for example, through the internet), encoding of video data that is stored on a data storage medium, decoding of video data that is stored on a data storage medium, or another application. In some examples, the video coding system may be configured to support unidirectional or bidirectional video transmission, to support applications such as streaming video transmission, video playing, video broadcasting, and/or videotelephony.

It should be noted that the video coding system shown in FIG. 3 is merely an example of the video coding system, and does not limit the video coding system in this application. The method for constructing a candidate motion information list provided in this application may also be applicable to a scenario in which there is no data communication between an encoding apparatus and a decoding apparatus. In other examples, to-be-encoded video data or the encoded video data may be retrieved from a local memory, may be transmitted in the streaming manner on a network, or the like. The video encoding apparatus may encode the to-be-encoded video data and store the encoded video data in the memory. The video decoding apparatus may also obtain the encoded video data from the memory and decode the encoded video data.

In FIG. 3, the source apparatus 10 includes a video source 101, a video encoder 102, and an output interface 103. In some examples, the output interface 103 may include a modulator/demodulator (modem) and/or a transmitter. The video source 101 may include a video capturing apparatus (for example, a camera), a video archive including previously captured video data, a video input interface for receiving video data from a video content provider, and/or a computer graphics system for generating video data, or a set of the foregoing video data sources.

The video encoder 102 may encode video data that is from the video source 101. In some examples, the source apparatus 10 directly transmits the encoded video data to the destination apparatus 20 through the output interface 103. In other examples, the encoded video data may alternatively be stored in the storage apparatus 40, so that the destination apparatus 20 subsequently accesses the encoded video data for decoding and/or playing.

In an example in FIG. 3, the destination apparatus 20 includes a display apparatus 201, a video decoder 202, and an input interface 203. In some examples, the input interface 203 includes a receiver and/or a modem. The input interface 203 may receive the encoded video data through the link 30 and/or from the storage apparatus 40. The display apparatus 201 may be integrated with the destination apparatus 20 or may be disposed outside the destination apparatus 20. Usually, the display apparatus 201 displays decoded video data. The display apparatus 201 may include a plurality of types of display apparatuses, for example, a liquid crystal display, a plasma display, an organic light-emitting diode display, or a display apparatus of another type.

Optionally, the video encoder 102 and the video decoder 202 may be respectively integrated with an audio encoder and an audio decoder, and may include an appropriate multiplexer-demultiplexer unit or other hardware and software, to encode both an audio and a video in a combined data stream or a separate data stream.

The video encoder 102 and the video decoder 202 each may include at least one microprocessor, a digital signal processor (digital signal processor, DSP), an application-specific integrated circuit (application-specific integrated circuit, ASIC), a field programmable gate array (field programmable gate array, FPGA), discrete logic, hardware, or any set thereof. If the method for constructing a candidate motion information list provided in this application is implemented by using software, an instruction used for the software may be stored in an appropriate non-volatile computer-readable storage medium, and at least one processor may be used to execute the instruction in hardware to implement this application. Any one of the foregoing content (including the hardware, the software, a set of the hardware and the software, and the like) may be considered as the at least one processor. The video encoder 102 may be included in an encoder, the video decoder 202 may be included in a decoder, and the encoder or the decoder may be a part of a combined encoder/decoder (codec) in a corresponding apparatus.

The video encoder 102 and the video decoder 202 in this application may perform operations according to a video compression standard (for example, HEVC), or may perform operations according to another industry standard. This is not specifically limited in this application.

Figure 6:
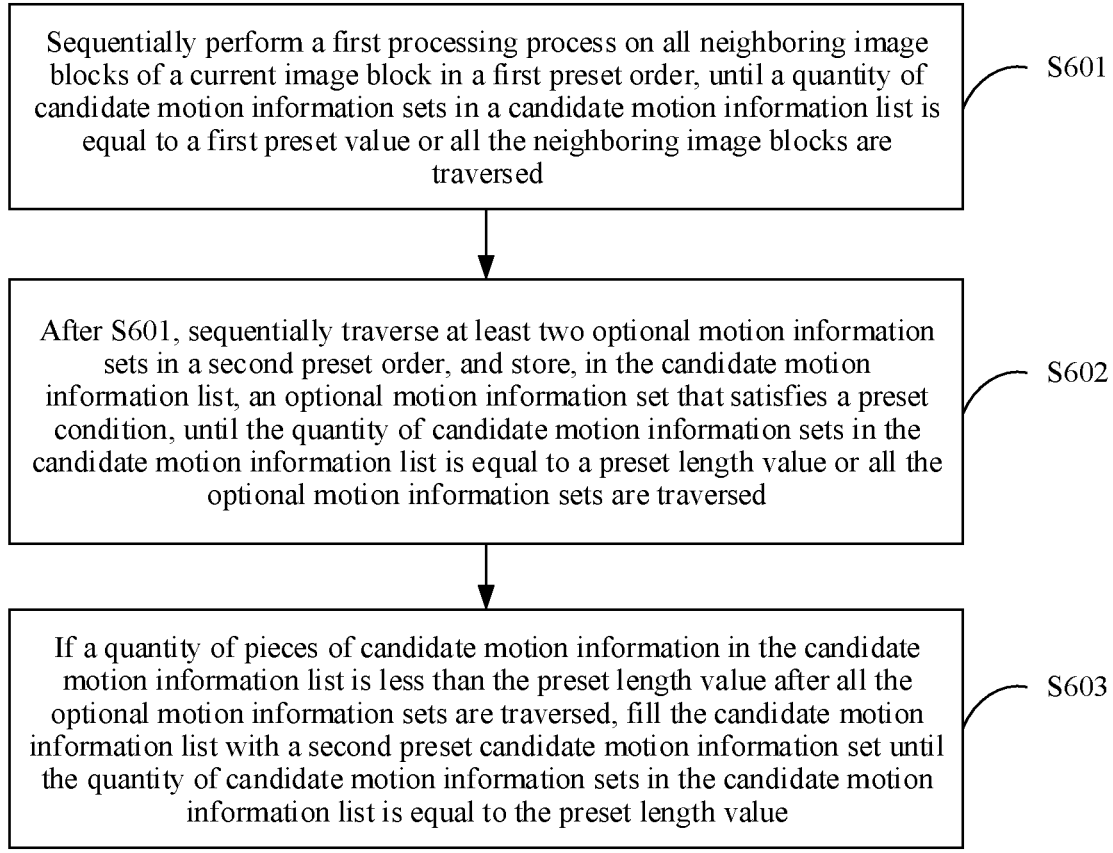
FIG. 6 is a first schematic flowchart of a method for constructing a candidate motion information list according to an embodiment of this application.

Refer to FIG. 6. Both the video encoder 102 and the video decoder 202 are configured to: sequentially perform a first processing process on all neighboring image blocks of a current image block in a first preset order, until a quantity of candidate motion information sets in a candidate motion information list is equal to a first preset value or all the neighboring image blocks are traversed (S601); after S601, sequentially traverse at least two extra to be selected motion information sets in a second preset order, and store, in the candidate motion information list, an extra to be selected motion information set that satisfies a preset condition, until the quantity of candidate motion information sets in the candidate motion information list is equal to a preset quantity value or all the extra to be selected motion information sets are traversed (S602); and if a quantity of candidate motion information sets in the candidate motion information list is less than the preset quantity value after all the extra to be selected motion information sets are traversed, fill the candidate motion information list with a first preset candidate motion information set until the quantity of candidate motion information sets in the candidate motion information list is equal to the preset quantity value (S603).

Figure 7:
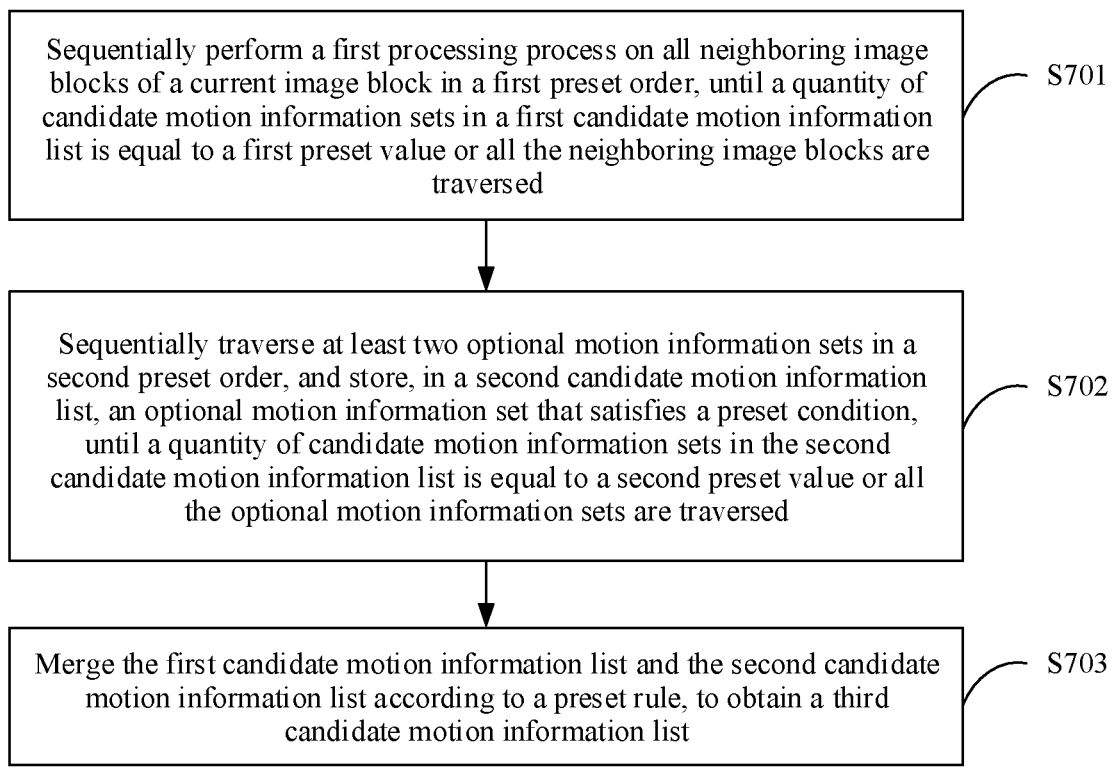
FIG. 7 is a second schematic flowchart of a method for constructing a candidate motion information list according to an embodiment of this application.

Refer to FIG. 7. The video encoder 102 and the video decoder 202 are alternatively configured to: sequentially perform a first processing process on all neighboring image blocks of a current image block in a first preset order, until a quantity of candidate motion information sets in a first candidate motion information list is equal to a first preset value or all the neighboring image blocks are traversed (S701); sequentially traverse at least two extra to be selected motion information sets in a second preset order, and store, in a second candidate motion information list, an extra to be selected motion information set that satisfies a preset condition, until a quantity of candidate motion information sets in the second candidate motion information list is equal to a second preset value or all the extra to be selected motion information sets are traversed (S702); and merge the first candidate motion information list and the second candidate motion information list according to a preset rule, to obtain a third candidate motion information list (S703).

Figure 8:
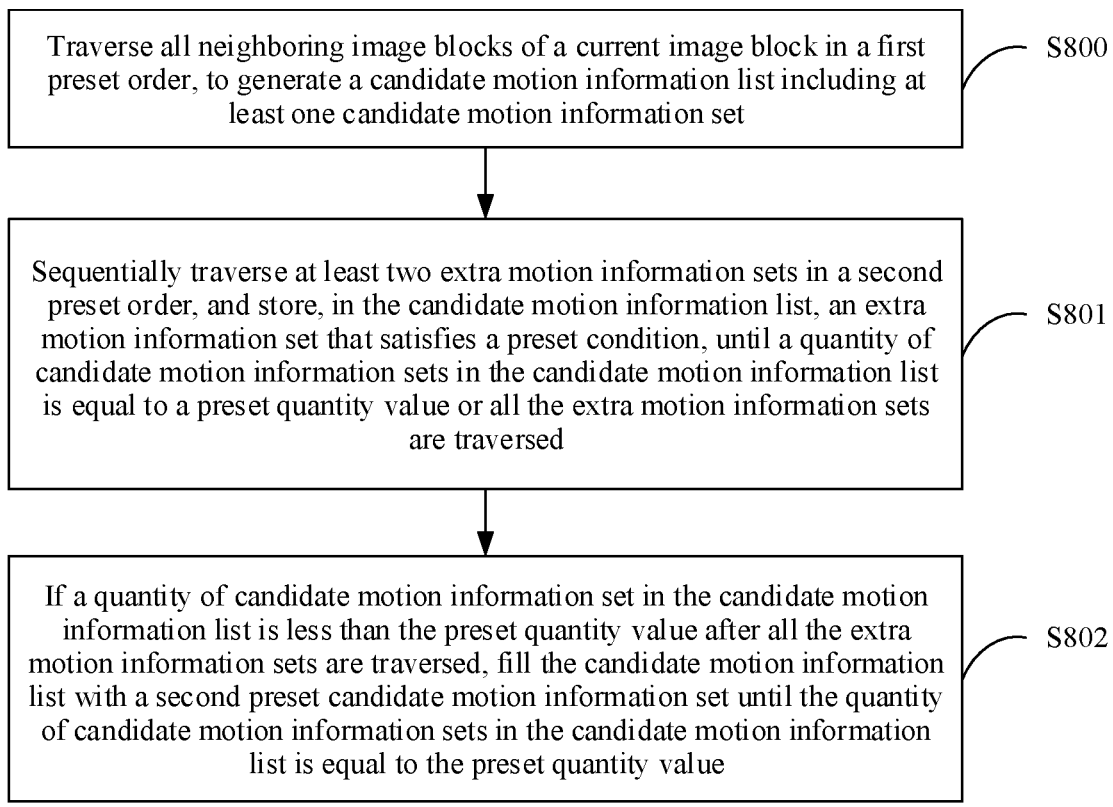
FIG. 8 is a third schematic flowchart of a method for constructing a candidate motion information list according to an embodiment of this application.

Refer to FIG. 8. The video encoder 102 and the video decoder 202 are alternatively configured to: traverse all neighboring image blocks of a current image block in a first preset order, to generate a candidate motion information list including at least one candidate motion information set (S800); after traversing all the neighboring image blocks of the current image block, sequentially traverse at least two extra to be selected motion information sets in a second preset order, and store, in the candidate motion information list, an extra to be selected motion information set that satisfies a preset condition, until a quantity of candidate motion information sets in the candidate motion information list is equal to a preset quantity value or all the extra to be selected motion information sets are traversed (S801); and if a quantity of candidate motion information sets in the candidate motion information list is less than the preset quantity value after all the extra to be selected motion information sets are traversed, fill the candidate motion information list with a third preset candidate motion information set until the quantity of candidate motion information sets in the candidate motion information list is equal to the preset quantity value (S802).

In addition, the video encoder 102 is further configured to: select an optimal candidate motion information set from the candidate motion information list as a motion information predictor of the current image block; determine motion information of the current image block, and calculate a difference between the motion information predictor and the motion information; and send the difference value and an index value of the optimal candidate motion information set in the candidate motion information list to a peer end.

The video decoder 202 is further configured to: parse a bitstream, to obtain a first index value and the motion information difference, in other words, determine an index value of a motion information predictor of a control point of the current image block in the candidate motion information list and the motion information difference; and obtain the motion information predictor of the control point, and determine motion information of the control point based on the motion information predictor of the control point and the motion information difference. In this way, the video decoder 202 may determine prediction pixels of the current image block based on the motion information of the control point.

Optionally, the video decoder 202 is further configured to: parse a bitstream, to obtain a second index value, in other words, determine an index value of motion information of a control point of the current image block in the candidate motion information list; and obtain the motion information of the control point. In this way, the video decoder 202 may determine prediction pixels of the current image block based on the motion information of the control point.

Figure 4:
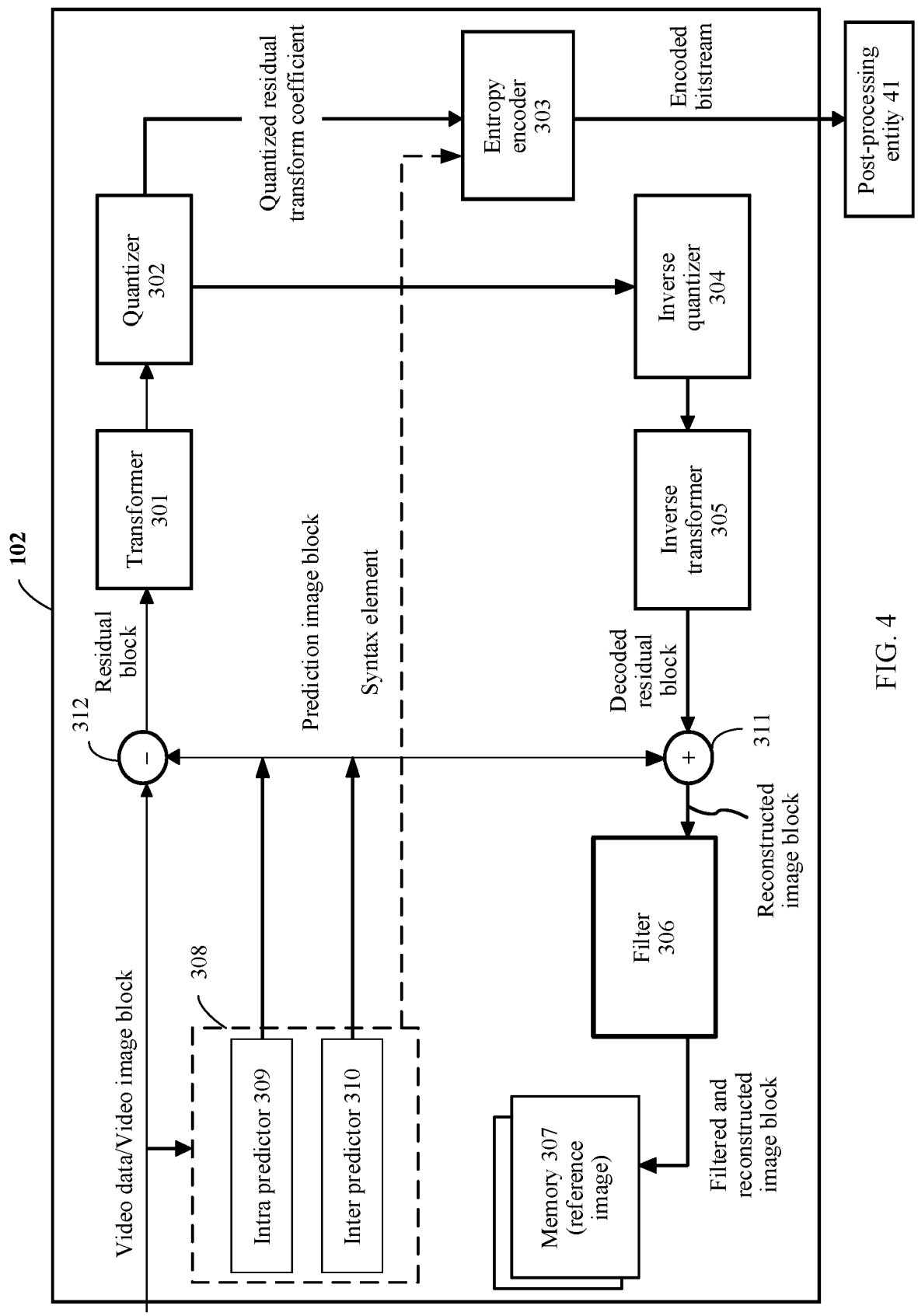
FIG. 4 is a schematic structural diagram of a video encoder according to an embodiment of this application.

FIG. 4 is a schematic structural diagram of the video encoder 102 according to an embodiment of this application. As shown in FIG. 4, the video encoder 102 is configured to output a video to a post-processing entity 41. The post-processing entity 41 represents an example of a video entity capable of processing encoded video data that is from the video encoder 102, for example, a media aware network element (MANE) or a splicing apparatus/an editing apparatus. In some cases, the post-processing entity 41 may be an example of a network entity. In some video encoding systems, the post-processing entity 41 and the video encoder 102 may be components of separate apparatuses. In other cases, functions of the post-processing entity 41 may be performed by a same apparatus including the video encoder 102. In an example, the post-processing entity 41 is an example of the storage apparatus 40 in FIG. 3.

As shown in FIG. 4, the video encoder 102 includes a transformer 301, a quantizer 302, an entropy encoder 303, a filter 306, a memory 307, a prediction processing unit 308, and a summator 312. The prediction processing unit 308 includes an intra predictor 309 and an inter predictor 310. To reconstruct an image block, the video encoder 102 further includes an inverse quantizer 304, an inverse transformer 305, and a summator 311. The filter 306 is specified to represent one or more loop filters, for example, a deblocking filter, an adaptive loop filter, and a sample adaptive offset filter.

The memory 307 may store video data encoded by a component of the video encoder 102. The video data stored in the memory 307 may be obtained from a video source 101. The memory 307 may be a reference image memory that stores reference video data used by the video encoder 102 to encode the video data in an intra or inter coding mode. The memory 307 may be a dynamic random access memory (dynamic RAM, DRAM) including a synchronous DRAM (synchronous DRAM, SDRAM), a magnetoresistive RAM (magnetic RAM, MRAM), a resistive RAM (resistive RAM, RRAM), or another type of memory apparatus.

The video encoder 102 receives video data and stores the video data in a video data memory. A partitioning unit partitions the video data into several image blocks, and these image blocks may be further partitioned into smaller blocks, for example, partitioned based on a quadtree structure or a binary-tree structure. The partitioning may further include partitioning into slices (slice), tiles (tile), or other larger units. The video encoder 102 is usually a component for encoding an image block in a to-be-encoded video slice. The slice may be partitioned into a plurality of image blocks (and may be partitioned into image block sets that are referred to as tiles).

The intra predictor 309 in the prediction processing unit 308 may perform intra predictive encoding on a current image block relative to one or more neighboring image blocks in a frame or slice that is the same as that of the current image block, to remove spatial redundancy. The inter predictor 310 in the prediction processing unit 308 may perform inter predictive encoding on the current image block relative to one or more prediction image blocks in one or more reference images, to remove temporal redundancy.

The prediction processing unit 308 may provide obtained intra-coded and inter-coded image blocks for the summator 310 to generate a residual block, and provide the residual block for the summator 309 to reconstruct an encoded block used as a reference image.

After the prediction processing unit 308 generates a prediction image block of the current image block through inter prediction and intra prediction, the video encoder 102 generates the residual image block by subtracting the prediction image from the to-be-encoded current image block. The summator 312 represents one or more components that perform this subtraction operation. Residual video data in the residual block may be included in one or more transform units (transform unit, TU), and applied to the transformer 301. The transformer 301 transforms the residual video data into a residual transform coefficient through transform such as discrete cosine transform (discrete cosine transform, DCT) or conceptually similar transform. The transformer 301 may convert the residual video data from a pixel value domain to a transform domain, for example, a frequency domain.

The transformer 301 may send the obtained transform coefficient to the quantizer 302. The quantizer 302 quantizes the transform coefficient to further reduce a bitrate. In some examples, the quantizer 302 may further scan a matrix including a quantized transform coefficient. Alternatively, the entropy encoder 303 may perform scanning.

After quantization, the entropy encoder 303 performs entropy encoding on the quantized transform coefficient. For example, the entropy encoder 303 may perform context-adaptive variable-length coding (context adaptive variable length coding, CAVLC), context-adaptive binary arithmetic coding (context based adaptive binary arithmetic coding, CABAC), or another entropy coding method or technology. After the entropy encoder 303 performs entropy encoding, an encoded bitstream may be sent to a video decoder 202, or archived for subsequent sending or subsequent retrieval by the video decoder 202. The entropy encoder 303 may further perform entropy encoding on a syntax element of the to-be-encoded current image block.

The inverse quantizer 304 and the inverse transformer 305 respectively perform inverse quantization and inverse transform, to reconstruct the residual block in a pixel domain, for example, to be subsequently used as a reference block of the reference image. The summator 311 adds a reconstructed residual block to the prediction image block generated by the inter predictor 310 or the intra predictor 309, to generate a reconstructed image block. A prediction image block of an image block can be obtained by performing processing (such as interpolation) on a reference image block of the image block.

It should be understood that other structural variants of the video encoder 102 may be used to encode a video stream. For example, for some image blocks or image frames, the video encoder 102 may directly quantize a residual signal, and correspondingly, processing by the transformer 301 and the inverse transformer 305 is not required. Alternatively, for some image blocks or image frames, the video encoder 102 does not generate residual data, and correspondingly, processing by the transformer 301, the quantizer 302, the inverse quantizer 304, and the inverse transformer 305 is not required. Alternatively, the video encoder 102 may directly store the reconstructed image block as the reference block without processing by the filter 306. Alternatively, the quantizer 302 and the inverse quantizer 304 in the video encoder 102 may be combined.

Figure 5:
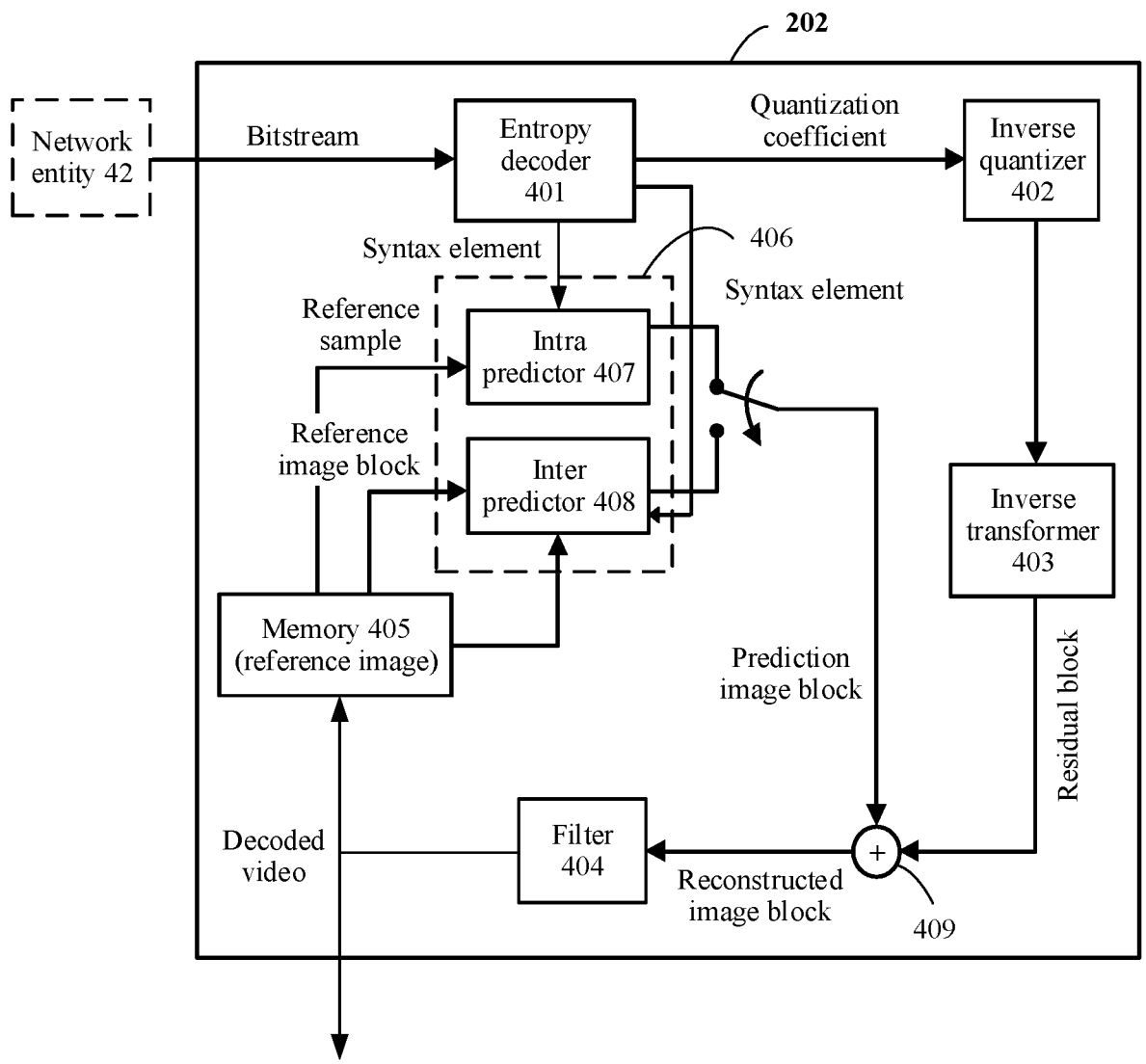
FIG. 5 is a schematic structural diagram of a video decoder according to an embodiment of this application.

FIG. 5 is a schematic structural diagram of the video decoder 202 according to an embodiment of this application. As shown in FIG. 5, the video decoder 202 includes an entropy decoder 401, an inverse quantizer 402, an inverse transformer 403, a filter 404, a memory 405, a prediction processing unit 406, and a summator 409. The prediction processing unit 406 includes an intra predictor 407 and an inter predictor 408. In some examples, the video decoder 202 may perform a decoding process that is roughly inverse to the encoding process performed by the video encoder 102 in FIG. 4.

In the decoding process, the video decoder 202 receives a bitstream from the video encoder 102. The video decoder 202 may receive video data from a network entity 42, and optionally, may further store the video data in a video data memory (which is not shown in the figure). The video data memory may store video data that is to be decoded by a component of the video decoder 202, for example, the encoded bitstream. The video data stored in the video data memory may be obtained from, for example, a local video source such as a storage apparatus 40 or a camera through wired or wireless network communication of the video data, or by accessing a physical data storage medium. Although the video data memory is not shown in FIG. 5, the video data memory and the memory 405 may be a same memory, or may be separately disposed memories. The video data memory and the memory 405 each may be constituted by any one of a plurality of types of memory apparatuses, for example, a dynamic random access memory (DRAM) including a synchronous DRAM (SDRAM), a magnetoresistive RAM (MRAM), a resistive RAM (RRAM), or another type of memory apparatus. In various examples, the video data memory may be integrated onto a chip together with other components of the video decoder 202, or may be disposed outside the chip relative to those components.

The network entity 42 may be, for example, a server, a MANE, a video editor/splicer, or another apparatus configured to implement one or more of the technologies described above. The network entity 42 may or may not include a video encoder, for example, the video encoder 102. Before the network entity 42 sends the bitstream to the video decoder 202, the network entity 42 may implement a part of the technologies described in this application. In some video decoding systems, the network entity 42 and the video decoder 202 may be components of separate apparatuses. In other cases, functions of the network entity 42 may be performed by a same apparatus including the video decoder 202. In some cases, the network entity 42 may be an example of the storage apparatus 40 in FIG. 3.

The entropy decoder 401 of the video decoder 202 performs entropy decoding on the bitstream to generate a quantized coefficient and some syntax elements. The entropy decoder 401 forwards the syntax elements to the filter 404. The video decoder 202 may receive syntax elements/a syntax element at a video slice level and/or an image block level.

The inverse quantizer 402 performs inverse quantization on, in other words, dequantizes, a quantized transform coefficient provided in the bitstream and decoded by the entropy decoder 401. An inverse quantization process may include: determining a to-be-applied quantization degree by using a quantization parameter calculated by the video encoder 102 for each image block in a video slice, and similarly determining a to-be-applied inverse quantization degree. The inverse transformer 403 applies inverse transform, for example, inverse DCT, inverse integer transform, or a conceptually similar inverse transform process, to the transform coefficient, to generate a pixel-domain residual block.

After the prediction processing unit 406 generates a prediction image block for a current image block or a subblock of the current image block, the video decoder 202 summates the residual block from the inverse transformer 403 and the corresponding prediction image block generated by the prediction processing unit 406, to obtain a reconstructed block, namely, a decoded image block. The summator 409 (which is also referred to as a reconstructor 409) represents a component that performs this summation operation. When necessary, a filter (in or after a decoding loop) may be further used to smoothen pixels, or video quality may be improved in another manner. The filter 404 may be one or more loop filters, for example, a deblocking filter, an adaptive loop filter (ALF), and a sample adaptive offset (SAO) filter.

It should be understood that other structural variants of the video decoder 202 may be used to decode the bitstream. For example, for some image blocks or image frames, the entropy decoder 401 of the video decoder 202 does not obtain the quantized coefficient through decoding, and correspondingly, processing by the inverse quantizer 402 and the inverse transformer 403 is not required. For example, the inverse quantizer 402 and the inverse transformer 403 in the video decoder 202 may be combined.

Based on the video coding system shown in FIG. 3, the video encoder 102 shown in FIG. 4, and the video decoder 202 shown in FIG. 5, the following describes in detail the method for constructing a candidate motion information list and the inter prediction method that are provided in this application.

FIG. 6 is a schematic flowchart of a method for constructing a candidate motion information list according to an embodiment of this application. The method shown in FIG. 6 is performed by a construction apparatus. The construction apparatus may be the video decoder 202 or the video encoder 102 in FIG. 3.

As shown in FIG. 6, the method for constructing a candidate motion information list in this embodiment of this application may include the following steps.

S601: The construction apparatus sequentially performs a first processing process on all neighboring image blocks of a current image block in a first preset order, until a quantity of candidate motion information sets in a candidate motion information list is equal to a first preset value or all the neighboring image blocks are traversed.

The first processing process is as follows: For the $i^{th}$ neighboring image block, when the $i^{th}$ neighboring image block is an affine coding block, the construction apparatus determines whether the $i^{th}$ neighboring image block and a candidate motion information set that has been stored in the candidate motion information list come from a same coding unit. If no candidate motion information set from the coding unit to which the $i^{th}$ neighboring image block belongs exists in the candidate motion information list, the construction apparatus determines candidate motion information of x control points of the current image block based on motion information of x control points of the $i^{th}$ neighboring image block, and stores, in the candidate motion information list, a candidate motion information set including the candidate motion information of the x control points of the current image block, where $i \in [1, n]$, n is a quantity of neighboring image blocks of the current image block, and both x and n are integers greater than or equal to 2.

Optionally, a method used by the construction apparatus to determine whether the $i^{th}$ neighboring image block and the candidate motion information set that has been stored in the candidate motion information list come from the same coding unit is as follows: The construction apparatus determines whether information of the top-left corner of the coding unit to which the $i^{th}$ neighboring image block belongs is the same as information of the top-left corner of a target coding unit, where the target coding unit is a coding unit to which a neighboring image block used to calculate the candidate motion information set that has been stored in the candidate motion information list belongs. Herein, the information of the top-left corner may be location information of the top-left corner.

For example, if an image block A0 and an image block B1 are adjacent to the current image block, a coding unit to which the image block B1 belongs is a CU 2, coordinates of the top-left corner of the CU 2 are $(x_0, y_0)$, a coding unit to which the image block A0 belongs is a CU 1, and coordinates of the op-left corner of CU 1 are $(x_1, y_1)$. If the candidate motion information list is empty in this case, the construction apparatus determines candidate motion information of a control point of the current image block based on motion information of a control point of the image block B1, and stores the candidate motion information in the candidate motion information list. If the candidate motion information list is not empty in this case, and includes candidate motion information determined based on motion information of a control point of the image block A0, the construction apparatus determines whether $x_1 \neq x_0 \| y_1 \neq y_0$ is satisfied. If the construction apparatus determines that $x_1 \neq x_0 \| y_1 \neq y_0$, the construction apparatus determines candidate motion information of a control point of the current image block based on motion information of a control point of the image block B1, and stores the candidate motion information in the candidate motion information list. Otherwise, the construction apparatus traverses a next neighboring image block.

Optionally, the construction apparatus may generate a coordinate list used to store coordinates of the top-left corner of the target coding unit. In this way, the construction apparatus directly determines whether the information of the top-left corner of the coding unit to which the $i^{th}$ neighboring image block belongs exists in the coordinate list. The construction apparatus may alternatively store coordinates of the top-left corner of the target coding unit in the candidate motion information list. This is not specifically limited in this embodiment of this application.

It should be noted that the construction apparatus may alternatively determine, by using another method, whether the $i^{th}$ neighboring image block and the candidate motion information set that has been stored in the candidate motion information list come from the same coding unit. This is not specifically limited in this embodiment of this application. For example, the construction apparatus may allocate a count value to each coding unit, or allocate a unique ID to each coding unit. In this way, the construction apparatus performs determining by comparing count values or based on an ID.

It can be learned that the first processing process is similar to the foregoing inherited control point motion vector prediction method. A difference is that, in the first processing process, the construction apparatus determines whether the $i^{th}$ neighboring image block and the candidate motion information set that has been stored in the candidate motion information list come from the same coding unit, to determine whether to determine the candidate motion information of the x control points of the current image block based on the motion information of the x control points of the $i^{th}$ neighboring image block, and further stores, in the candidate motion information list, the candidate motion information set including the candidate motion information of the x control points of the current image block. When adding new candidate motion information to the candidate motion information list each time, the construction apparatus does not need to determine whether the new candidate motion information exists in the candidate motion information list. This effectively reduces calculation complexity and a delay.

The first preset value in this embodiment of this application may be a maximum inherited list length MaxNumInheritMrgCand. The first preset value is an integer less than a preset quantity value, for example, 1, 2, or 3. The preset quantity value is a maximum length value of the candidate motion information. The construction apparatus sequentially performs the first processing process on all the neighboring image blocks of the current image block in the first preset order. If the quantity of candidate motion information sets in the candidate motion information list reaches the first preset value, the construction apparatus terminates generation of the candidate motion information list; otherwise, the construction apparatus continues to traverse a next neighboring image block.

In this embodiment of this application, a quantity of times that the construction apparatus traverses the neighboring image block by using the first processing process is limited by the first preset value. In other words, a quantity of times of performing the inherited control point motion vector prediction method is reduced. Because the calculation complexity of the inherited control point motion vector prediction method is relatively high, after the quantity of times of performing the inherited control point motion vector prediction method is reduced, the calculation complexity is effectively reduced.

S602: After performing S601, the construction apparatus sequentially traverses at least two extra to be selected motion information sets in a second preset order, and stores, in the candidate motion information list, an extra to be selected motion information set that satisfies a preset condition, until the quantity of candidate motion information sets in the candidate motion information list is equal to the preset quantity value or all the extra to be selected motion information sets are traversed.

The preset quantity value is greater than the first preset value. The extra to be selected motion information set includes extra to be selected motion information of at least two control points of the current image block, and the extra to be selected motion information of the control point is motion information of an inter-coded image block adjacent to the current image block.

Specifically, after the quantity of candidate motion information sets in the candidate motion information list is equal to the first preset value, the construction apparatus determines extra to be selected motion information of each control point of the current image block, and combines obtained extra to be selected motion information of the control points to obtain the at least two extra to be selected motion information sets.

Further, the construction apparatus performs any one of the following three optional implementations.

In a first optional implementation, for a method used by the construction apparatus to generate the at least two extra to be selected motion information sets, sequentially traverse the at least two extra to be selected motion information sets, and store, in the candidate motion information list, the extra to be selected motion information set that satisfies the preset condition, refer to the descriptions of the step A and the step B.

In a second optional implementation, after the at least two extra to be selected motion information sets are generated, a method used by the construction apparatus to sequentially traverse the at least two extra to be selected motion information sets, and store, in the candidate motion information list, the extra to be selected motion information set that satisfies the preset condition may be: For each extra to be selected motion information set, the construction apparatus determines whether reference frame indexes of all control points in the extra to be selected motion information set are the same. When the reference frame indexes of all the control points in the extra to be selected motion information set are the same, the construction apparatus stores the extra to be selected motion information set in the candidate motion information list. The construction apparatus does not determine a motion vector of a control point in the set or perform motion vector scaling. This is different from the foregoing step A and step B, and avoids relatively high calculation complexity caused by motion vector scaling. In other words, in this scenario, reference frame indexes of all control points in the extra to be selected motion information set that satisfies the preset condition are the same.

In a third optional implementation, after the at least two extra to be selected motion information sets are generated, a method used by the construction apparatus to sequentially traverse the at least two extra to be selected motion information sets, and store, in the candidate motion information list, the extra to be selected motion information set that satisfies the preset condition may be: For each extra to be selected motion information set, the construction apparatus determines whether reference frame indexes of all control points in the extra to be selected motion information set are the same. When the reference frame indexes of all the control points in the extra to be selected motion information set are the same, the construction apparatus determines whether extra to be selected motion vectors of all the control points in the extra to be selected motion information set are the same. If the extra to be selected motion vectors of all the control points in the extra to be selected motion information set are different, the construction apparatus stores the extra to be selected motion information set in the candidate motion information list. The construction apparatus does not perform motion vector scaling. This is different from the foregoing step A and step B, and avoids relatively high calculation complexity caused by motion vector scaling. In other words, in this scenario, reference frame indexes of all control points in the extra to be selected motion information set that satisfies the preset condition are the same and extra to be selected motion vectors of at least two control points in the extra to be selected motion information set that satisfies the preset condition are different.

Optionally, the extra to be selected motion information set generated by the construction apparatus may further include at least extra to be selected motion information of a first control point and extra to be selected motion information of a second control point, where the first control point and the second control point are neighboring control points of the current image block. In other words, the extra to be selected motion information set in this embodiment of this application cannot include only extra to be selected motion information of a diagonal control point of the current image block.

For example, with reference to the foregoing step B, the construction apparatus in this application may combine extra to be selected motion vectors of any two control points, to construct a 4-parameter affine motion model. The extra to be selected motion vectors of the two control points may be combined as follows: (vcp1, vcp2), (vcp2, vcp4), (vcp1, vcp3), and (vcp3, vcp4). For example, in this embodiment of this application, the 4-parameter affine motion model constructed by using vcp1 and vcp2 is denoted as Affine (vcp1, vcp2).

The construction apparatus combines extra to be selected motion vectors of any three control points, to construct a 6-parameter affine motion model. The extra to be selected motion vectors of the three control points may be combined as follows: (vcp1, vcp2, vcp4), (vcp1, vcp2, vcp3), (vcp2, vcp3, vcp4), and (vcp1, vcp3, vcp4). For example, in this embodiment of this application, the 6-parameter affine motion model constructed by using vcp1, vcp2, and vcp3 is denoted as Affine (vcp1, vcp2, vcp3).

The construction apparatus combines extra to be selected motion vectors of four control points, to construct an 8-parameter affine motion model. For example, in this embodiment of this application, the 8-parameter bilinear model constructed by using vcp1, vcp2, vcp3, and vcp4 is denoted as Bilinear (vcp1, vcp2, vcp3, vcp4).

The construction apparatus sequentially determines a reference frame index and an extra to be selected motion vector in each extra to be selected motion information set in the following order: Affine (vcp1, vcp2, vcp3)→Affine (vcp1, vcp2, vcp4)→Affine (vcp1, vcp3, vcp4)→Affine (vcp2, vcp3, vcp4)→Affine (vcp1, vcp2)→Affine (vcp1, vcp3)→Affine (vcp2, vcp4)→Affine (vcp3, vcp4).

S603: If a quantity of candidate motion information sets in the candidate motion information list is less than the preset quantity value after all the extra to be selected motion information sets are traversed, the construction apparatus fills the candidate motion information list with a first preset candidate motion information set until the quantity of candidate motion information sets in the candidate motion information list is equal to the preset quantity value.

In this embodiment of this application, the first preset value is set, so that a quantity of times of performing the first processing process is effectively limited. This reduces the calculation complexity and the delay. Further, the extra to be selected motion information set may include at least motion information of two neighboring control points, and the construction apparatus no longer performs motion vector scaling. This further reduces the calculation complexity and the delay.

FIG. 7 is another schematic flowchart of a method for constructing a candidate motion information list according to an embodiment of this application. The method shown in FIG. 7 is performed by a construction apparatus. The construction apparatus may be the video decoder 202 or the video encoder 102 in FIG. 3.

As shown in FIG. 7, the method for constructing a candidate motion information list in this embodiment of this application may include the following steps.

S701: The construction apparatus sequentially performs a first processing process on all neighboring image blocks of a current image block in a first preset order, until a quantity of candidate motion information sets in a first candidate motion information list is equal to a first preset value or all the neighboring image blocks are traversed.

For S701, refer to the description of the foregoing S601. Details are not described herein again.

S702: The construction apparatus sequentially traverses at least two extra to be selected motion information sets in a second preset order, and stores, in a second candidate motion information list, an extra to be selected motion information set that satisfies a preset condition, until a quantity of candidate motion information sets in the second candidate motion information list is equal to a second preset value or all the extra to be selected motion information sets are traversed.

The extra to be selected motion information set includes extra to be selected motion information of at least two control points of the current image block, and the extra to be selected motion information of the control point is motion information of an inter-coded image block adjacent to the current image block.

Reference frame indexes of all control points in the extra to be selected motion information set that satisfies the preset condition are the same. Alternatively, reference frame indexes of all control points in the extra to be selected motion information set that satisfies the preset condition are the same and extra to be selected motion vectors of at least two control points in the extra to be selected motion information set that satisfies the preset condition are different.

For S702, refer to the description of the second or the third optional implementation in the foregoing S602. Details are not described herein again.

S703: The construction apparatus merges the first candidate motion information list and the second candidate motion information list according to a preset rule, to obtain a third candidate motion information list.

Optionally, the construction apparatus may place (partial) candidate motion information in the first candidate motion information list before or after (partial) candidate motion information in the second candidate motion information list. This is not specifically limited in this embodiment of this application.

Optionally, the construction apparatus may directly merge the first candidate motion information list and the second candidate motion information list. Alternatively, the construction apparatus may determine whether a same candidate motion information set exists in the first candidate motion information list and the second candidate motion information list. If the same candidate motion information set exists in the first candidate motion information list and the second candidate motion information list, the construction apparatus deletes the repeated candidate motion information set.

Herein, description is provided by using an example in which the construction apparatus places all candidate motion information in the first candidate motion information list before all candidate motion information in the second candidate motion information list.

Specifically, the construction apparatus places all the candidate motion information in the first candidate motion information list before all the candidate motion information in the second candidate motion information list, to generate a target candidate motion information list. Then, the construction apparatus determines whether a quantity of candidate motion information sets in the target candidate motion information list is less than a preset quantity value. If the quantity of candidate motion information sets in the target candidate motion information list is less than the preset quantity value, the construction apparatus fills the target candidate motion information list with a second preset candidate motion information set until the quantity of candidate motion information sets in the target candidate motion information list is equal to the preset quantity value. In this way, the construction apparatus uses, as the third candidate motion information list, a target candidate motion information list obtained after filling. If the quantity of candidate motion information sets in the target candidate motion information list is equal to the preset quantity value, the construction apparatus uses the target candidate motion information list as the third candidate motion information list. If the quantity of candidate motion information sets in the target candidate motion information list is greater than the preset quantity value, the construction apparatus deletes at least one piece of candidate motion information in the target candidate motion information list, so that a quantity of candidate motion information sets in a target candidate motion information list obtained after deletion is equal to the preset quantity value, and uses, as the third candidate motion information list, the target candidate motion information list obtained after deletion.

Certainly, in addition to the foregoing examples, based on the preset quantity value, the construction apparatus may also select A candidate motion information sets from the first candidate motion information list and select B candidate motion information sets from the second candidate motion information list, to generate the third candidate motion information set list including the A candidate motion information sets and the B candidate motion information sets. Herein, a sum of A and B is equal to the preset quantity value. In this embodiment of this application, a method for generating the third candidate motion information list is not specifically limited.

It should be noted that the construction apparatus may perform S701 before S702, or may perform S702 before S701, or may simultaneously perform S701 and S702. This is not specifically limited in this embodiment of this application.

The construction apparatus separately constructs the first candidate motion information list and the second candidate motion information list, and then merges the first candidate motion information list and the second candidate motion information list. In a process of constructing the first candidate motion information list and the second candidate motion information list, the construction apparatus limits lengths of the first candidate motion information list and the second candidate motion information list. This effectively reduces calculation complexity and a delay.

FIG. 8 is another schematic flowchart of a method for constructing a candidate motion information list according to an embodiment of this application. The method shown in FIG. 8 is performed by a construction apparatus. The construction apparatus may be the video decoder 202 or the video encoder 102 in FIG. 3.

As shown in FIG. 8, the method for constructing a candidate motion information list in this embodiment of this application may include the following steps.

S800: The construction apparatus traverses all neighboring image blocks of a current image block in a first preset order, to generate a candidate motion information list including at least one candidate motion information set.

It should be noted that, in a process of traversing a neighboring location of the current image block, whether an image block in which the traversed neighboring location is located is an affine coding block further needs to be determined. If the image block is the affine coding block, the affine coding block may be obtained. In addition, candidate control point motion information of the current image block is derived based on motion information of a control point of the affine coding block. If an image block in which a neighboring location is located is a translational block, the candidate control point motion information of the current image block cannot be derived based on the translational block. Therefore, in the step S800, if an image block in which a neighboring location is located is the translational block, another neighboring location of the current image block needs to be continuously traversed until an image block in which a traversed neighboring location is located is the affine coding block.

The candidate motion information set includes candidate motion information of x control points of the current image block, where x is an integer greater than or equal to 2.

For a process of S800, refer to the description of the foregoing inherited control point motion vector prediction method or the description of FIG. 1. Details are not described herein again.

S801: After traversing all the neighboring image blocks of the current image block, the construction apparatus sequentially traverses at least two extra to be selected motion information sets in a second preset order, and stores, in the candidate motion information list, an extra to be selected motion information set that satisfies a preset condition, until a quantity of candidate motion information sets in the candidate motion information list is equal to a preset quantity value or all the extra to be selected motion information sets are traversed.

For S801, refer to the description of the second or the third optional implementation in the foregoing S602. Details are not described herein again.

S802: If a quantity of candidate motion information sets in the candidate motion information list is less than the preset quantity value after all the extra to be selected motion information sets are traversed, the construction apparatus fills the candidate motion information list with a third preset candidate motion information set until the quantity of candidate motion information sets in the candidate motion information list is equal to the preset quantity value.

For S802, refer to the description of the foregoing S603. Details are not described herein again.

When processing an extra to be selected motion information set, the construction apparatus only determines reference frame indexes and extra to be selected motion vectors of all control points in the extra to be selected motion information set, and determines, based on a determining result, whether to store the extra to be selected motion information set in the candidate motion information list. The construction apparatus neither needs to perform motion vector scaling, nor needs to first calculate a new candidate motion information set and then determine whether same motion information exists in the candidate motion information list. This reduces computing complexity and a delay.

In addition, the embodiments of this application further provide an inter prediction method. Specifically, an inter prediction apparatus obtains and parses a bitstream, to obtain a first index value and a motion information difference, where the first index value is an index value of a motion information predictor of a control point of a current image block in a candidate motion information list, and the candidate motion information list is generated by the foregoing construction apparatus by using the construction method described in any one of FIG. 6 to FIG. 8. The inter prediction apparatus obtains the motion information predictor of the control point from the candidate motion information list based on the first index value. The inter prediction apparatus determines motion information of the control point based on the motion information predictor of the control point and the motion information difference. The inter prediction apparatus determines prediction pixels of the current image block based on the motion information of the control point.

It is easy to understand that the inter prediction method is essentially generating the candidate motion information list according to the construction method provided in the embodiments of this application, and performing, by a decoder side, inter prediction based on the candidate motion information list by using a preset affine AMVP mode.

The embodiments of this application further provide an inter prediction method. Specifically, an inter prediction apparatus obtains and parses a bitstream, to obtain a second index value, where the second index value is an index value of motion information of a control point of a current image block in a candidate motion information list, and the candidate motion information list is generated by the foregoing construction apparatus by using the construction method described in any one of FIG. 6 to FIG. 8. The inter prediction apparatus obtains the motion information of the control point from the candidate motion information list based on the second index value. The inter prediction apparatus determines prediction pixels of the current image block based on the motion information of the control point.

It is easy to understand that the inter prediction method is essentially generating the candidate motion information list according to the construction method provided in the embodiments of this application, and performing, by a decoder side, inter prediction based on the candidate motion information list by using an affine merge mode.

An embodiment of this application provides an apparatus for constructing a candidate motion information list. The construction apparatus may be a video decoder, a video encoder, or a decoder. Specifically, the apparatus for constructing a candidate motion information list is configured to perform steps performed by the construction apparatus in the foregoing method for constructing a candidate motion information list. The construction apparatus provided in this embodiment of this application may include modules corresponding to the corresponding steps.

In the embodiments of this application, the apparatus for constructing a candidate motion information list may be divided into functional modules based on the foregoing method examples. For example, each functional module may be obtained through division based on a corresponding function, or two or more functions may be integrated into one processing module. The integrated module may be implemented in a form of hardware, or may be implemented in a form of a software functional module. In the embodiments of this application, division into the modules is an example, is merely logical function division, and may be other division in actual implementation.

Figure 9:
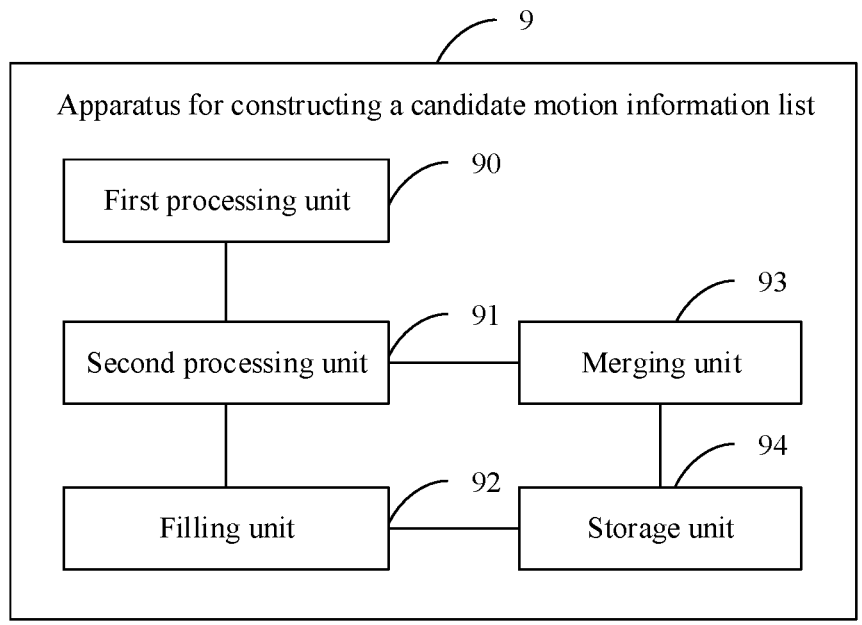
FIG. 9 is a first schematic structural diagram of an apparatus for constructing a candidate motion information list according to an embodiment of this application.

When each functional module is obtained through division based on a corresponding function, FIG. 9 is a possible schematic structural diagram of the apparatus for constructing a candidate motion information list in the foregoing embodiments. As shown in FIG. 9, the apparatus 9 for constructing a candidate motion information list includes a first processing unit 90, a second processing unit 91, a filling unit 92, a merging unit 93, and a storage unit 94.

The first processing unit 90 is configured to support the apparatus for constructing a candidate motion information list, to perform S601, S701, S801, and the like in the foregoing embodiments, and/or is used in another process of the technologies described in this specification.

The second processing unit 91 is configured to support the apparatus for constructing a candidate motion information list, to perform S602, S702, S802, and the like in the foregoing embodiments, and/or is used in another process of the technologies described in this specification.

The filling unit 92 is configured to support the apparatus for constructing a candidate motion information list, to perform S603, S802, and the like in the foregoing embodiments, and/or is used in another process of the technologies described in this specification.

The merging unit 93 is configured to support the apparatus for constructing a candidate motion information list, to perform S703 and the like in the foregoing embodiments, and/or is used in another process of the technologies described in this specification.

The storage unit 94 may be configured to store program code and data of the apparatus for constructing a candidate motion information list, and may further be configured to store a candidate motion information list.

All related content of the steps in the foregoing method embodiments may be cited in function description of the corresponding functional modules. Details are not described herein again.

Figure 10:
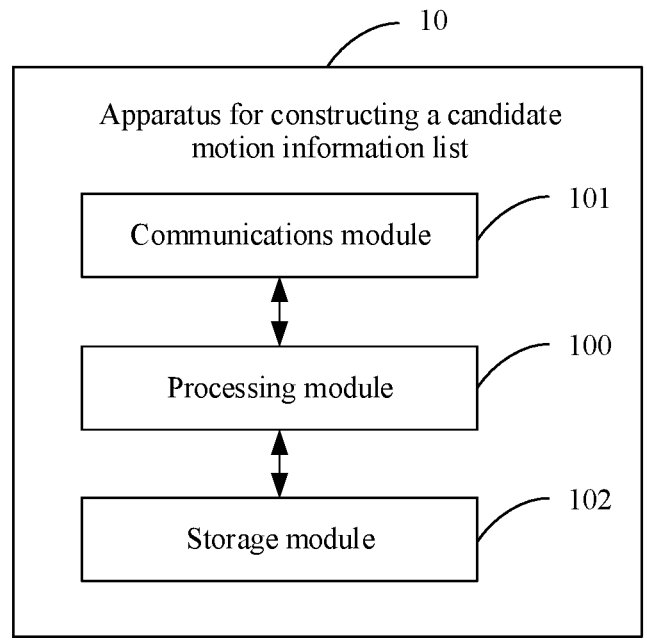
FIG. 10 is a second schematic structural diagram of an apparatus for constructing a candidate motion information list according to an embodiment of this application.

When an integrated unit is used, FIG. 10 is a schematic structural diagram of the apparatus for constructing a candidate motion information list provided in the embodiments of this application. In FIG. 10, the apparatus 10 for constructing a candidate motion information list includes a processing module 100 and a communications module 101. The processing module 100 is configured to control and manage an action of the apparatus for constructing a candidate motion information list, for example, perform steps performed by the first processing unit 90, the second processing unit 91, the filling unit 92, and the merging unit 93, and/or configured to perform another process of the technologies described in this specification. The communications module 101 is configured to support interaction between the apparatus for constructing a candidate motion information list and another device. As shown in FIG. 10, the apparatus for constructing a candidate motion information list may further include a storage module 102. The storage module 102 is configured to store program code and data of the apparatus for constructing a candidate motion information list, for example, store content stored by the storage unit 94.

The processing module 100 may be a processor or a controller, for example, may be a central processing unit (Central Processing Unit, CPU), a general-purpose processor, a digital signal processor (Digital Signal Processor, DSP), an ASIC, an FPGA or another programmable logic device, a transistor logic device, a hardware component, or any set thereof. The processing module 100 may implement or execute various example logical blocks, modules, and circuits described with reference to content disclosed in this application. The processor may alternatively be a set for implementing a computing function, for example, a set including one or more microprocessors, or a combination of a DSP and a microprocessor. The communications module 101 may be a transceiver, an RF circuit, a communications interface, or the like. The storage module 102 may be a memory.

All related content of the scenarios in the foregoing method embodiments may be cited in function description of the corresponding functional modules. Details are not described herein again.

Both the apparatus 9 for constructing a candidate motion information list and the apparatus 10 for constructing a candidate motion information list may perform the methods for constructing a candidate motion information list that are shown in FIG. 6 to FIG. 8. The apparatus 9 for constructing a candidate motion information list and the apparatus 10 for constructing a candidate motion information list each may specifically be a video decoding apparatus or another device having a video coding function. The apparatus 9 for constructing a candidate motion information list and the apparatus 10 for constructing a candidate motion information list may be configured to perform image prediction in a decoding process.

An embodiment of this application provides an inter prediction apparatus. The inter prediction apparatus may be a video decoder, a video encoder, or a decoder. Specifically, the inter prediction apparatus is configured to perform steps performed by the inter prediction apparatus in the foregoing inter prediction method. The inter prediction apparatus provided in this embodiment of this application may include modules corresponding to the corresponding steps.

In the embodiments of this application, the inter prediction apparatus may be divided into functional modules based on the foregoing method examples. For example, each functional module may be obtained through division based on a corresponding function, or two or more functions may be integrated into one processing module. The integrated module may be implemented in a form of hardware, or may be implemented in a form of a software functional module. In the embodiments of this application, division into the modules is an example, is merely logical function division, and may be other division in actual implementation.

Figure 11:
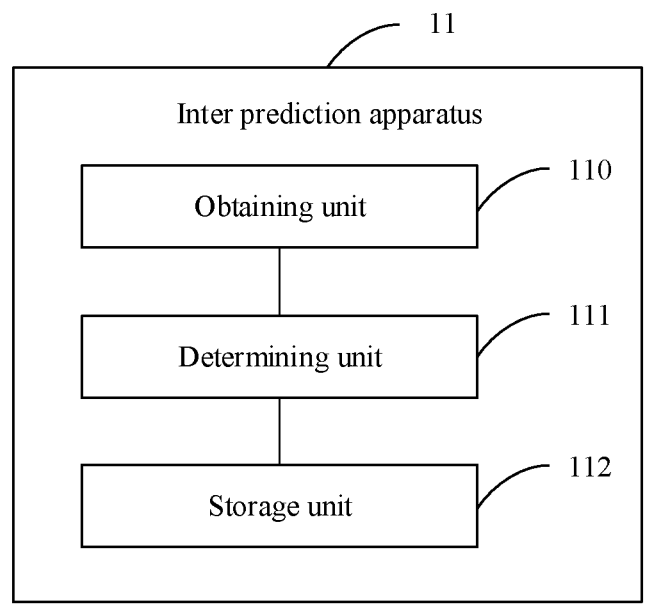
FIG. 11 is a first schematic structural diagram of an inter prediction apparatus according to an embodiment of this application.

When each functional module is obtained through division based on a corresponding function, FIG. 11 is a possible schematic structural diagram of the inter prediction apparatus in the foregoing embodiments. As shown in FIG. 11, the inter prediction apparatus 11 includes an obtaining unit 110, a determining unit 111, and a storage unit 112.

The obtaining unit 110 is configured to support the inter prediction apparatus to perform the foregoing steps of "obtaining and parsing the bitstream to obtain the first index value and the motion information difference", "obtaining the motion information predictor of the control point from the candidate motion information list based on the first index value", "obtaining and parsing the bitstream to obtain the second index value", and "obtaining the motion information of the control point from the candidate motion information list based on the second index value", and the like, and/or is used in another process of the technologies described in this specification.

The determining unit 111 is configured to support the inter prediction apparatus to perform the foregoing steps of "determining the motion information of the control point based on the obtained motion information predictor of the control point and the obtained motion information difference", "determining the prediction pixels of the current image block based on the motion information of the control point", and the like, and/or is used in another process of the technologies described in this specification.

The storage unit 112 may be configured to store program code and data of the inter prediction apparatus.

All related content of the steps in the foregoing method embodiments may be cited in function description of the corresponding functional modules. Details are not described herein again.

Figure 12:
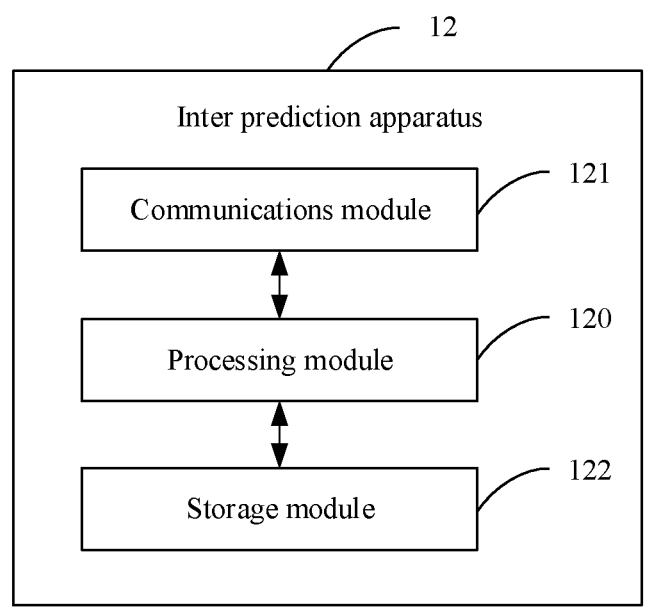
FIG. 12 is a second schematic structural diagram of an inter prediction apparatus according to an embodiment of this application.

When an integrated unit is used, FIG. 12 is a schematic structural diagram of the inter prediction apparatus provided in the embodiments of this application. In FIG. 12, the inter prediction apparatus 12 includes a processing module 120 and a communications module 121. The processing module 120 is configured to control and manage an action of the inter prediction apparatus, for example, perform steps performed by the obtaining unit 110 and the determining unit 111, and/or configured to perform another process of the technologies described in this specification. The communications module 121 is configured to support interaction between the inter prediction apparatus and another device. As shown in FIG. 12, the inter prediction apparatus may further include a storage module 122. The storage module 122 is configured to store program code and data of the inter prediction apparatus, for example, store content stored by the storage unit 112.

The processing module 120 may be a processor or a controller, for example, may be a CPU, a general-purpose processor, a DSP, an ASIC, an FPGA or another programming logic device, a transistor logic device, a hardware component, or any combination thereof. The processing module 120 may implement or execute various example logical blocks, modules, and circuits described with reference to content disclosed in this application. The processor may alternatively be a combination for implementing a computing function, for example, a combination including one or more microprocessors, or a combination of a DSP and a microprocessor. The communications module 121 may be a transceiver, an RF circuit, a communications interface, or the like. The storage module 122 may be a memory.

All related content of the scenarios in the foregoing method embodiments may be cited in function description of the corresponding functional modules. Details are not described herein again.

Both the inter prediction apparatus 11 and the inter prediction apparatus 12 may perform the foregoing inter prediction method. The inter prediction apparatus 11 and the inter prediction apparatus 12 each may specifically be a video decoding apparatus or another device having a video coding function. The inter prediction apparatus 11 and the inter prediction apparatus 12 may be configured to perform image prediction in a decoding process.

This application further provides a terminal. The terminal includes one or more processors, a memory, and a communications interface. The memory and the communications interface are coupled to the one or more processors. The memory is configured to store computer program code. The computer program code includes an instruction. When the one or more processors execute the instruction, the terminal performs the method for constructing a candidate motion information list or the inter prediction method in the embodiments of this application.

The terminal herein may be a video display device, a smartphone, a portable computer, or another device that can process or play a video.

This application further provides a video decoder, including a non-volatile storage medium and a central processing unit. The non-volatile storage medium stores an executable program. The central processing unit is connected to the non-volatile storage medium, and executes the executable program to perform the method for constructing a candidate motion information list and the inter prediction method in the embodiments of this application.

This application further provides a decoder. The decoder includes the apparatus for constructing a candidate motion information list (the apparatus 9 for constructing a candidate motion information list or the apparatus 10 for constructing a candidate motion information list) in the embodiments of this application, the inter prediction apparatus (the inter prediction apparatus 11 or the inter prediction apparatus 12) in the embodiments of this application, and a reconstruction module. The reconstruction module is configured to determine a reconstructed pixel value of a current image block based on a prediction pixel obtained by the inter prediction apparatus.

Another embodiment of this application further provides a computer-readable storage medium. The computer-readable storage medium includes one or more pieces of program code. The one or more programs include an instruction. When a processor of a terminal executes the program code, the terminal performs the method for constructing a candidate motion information list in any one of FIG. 6 to FIG. 8 or performs the inter prediction method.

In another embodiment of this application, a computer program product is further provided. The computer program product includes a computer-executable instruction, and the computer-executable instruction is stored in a computer-readable storage medium. At least one processor of a terminal may read the computer-executable instruction from the computer-readable storage medium. The at least one processor executes the computer-executable instruction, to enable the terminal to perform the method for constructing a candidate motion information list in any one of FIG. 6 to FIG. 8 or perform the inter prediction method.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on a computer, the procedures or the functions according to the embodiments of this application are all or partially generated.

The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (solid state disk, SSD)), or the like.

The foregoing descriptions about the implementations allow a person skilled in the art to clearly understand that, for the purpose of convenient and brief description, division into the foregoing functional modules is taken as an example for illustration. In actual application, the foregoing functions can be allocated to different functional modules and implemented based on a requirement, that is, an inner structure of the apparatus is divided into different functional modules to implement all or some of the functions described above.

In the several embodiments provided in this application, it should be understood that the disclosed apparatus and method may be implemented in another manner. For example, the described apparatus embodiments are merely examples. For example, division into the modules or units is merely logical function division, and may be other division in actual implementation. For example, a plurality of units or components may be combined or may be integrated into another apparatus, or some features may be ignored or not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may be one or more physical units, and may be located in one place, or may be distributed on different places. Some or all of the units may be selected based on an actual requirement to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of the embodiments of this application essentially, or the part contributing to the prior art, or all or some of the technical solutions may be implemented in a form of a software product. The software product is stored in a storage medium and includes several instructions for instructing a device (which may be a single-chip microcomputer, a chip, or the like) or a processor (processor) to perform all or some of the steps of the methods in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method for constructing a candidate motion information list, comprising:
   generating the candidate motion information list comprising at least one candidate motion information set obtained from a neighboring affine image block of a current image block by using an inherited control point motion vector prediction method,
   wherein generating the candidate motion information list comprises sequentially performing a first processing process on neighboring image blocks of the current image block in a first preset order, until a quantity of candidate motion information sets in the candidate motion information list is equal to a first preset value or until all neighboring image blocks of the current image block have been traversed, wherein the first processing process comprises:
      for an $i^{th}$ ($i \in [1, n]$) neighboring image block, based on the $i^{th}$ neighboring image block being an affine coding block, determining whether the $i^{th}$ neighboring image block and a candidate motion information set that has been stored in the candidate motion information list come from a same coding unit; and
      in case that no candidate motion information set from the coding unit to which the $i^{th}$ neighboring image block belongs exists in the candidate motion information list, determining candidate motion information of x control points of the current image block based on motion information of x control points of the $i^{th}$ neighboring image block, and storing, in the candidate motion information list, a candidate motion information set including the candidate motion information of the x control points of the current image block, where n is a quantity of neighboring image blocks of the current image block, and both x and n are integers greater than or equal to 2;
   storing, in the candidate motion information list, an extra to-be-selected motion information set that satisfies a preset condition, wherein the extra to-be-selected motion information set comprises extra to-be-selected motion vectors of at least two control points of the current image block, a respective extra to-be-selected motion vector of a respective control point is a motion vector of an inter-coded image block adjacent to the current image block, and reference frame indexes of all control points in the extra to-be-selected motion information set that satisfies the preset condition are the same; and
   based on the quantity of candidate motion information sets in the candidate motion information list being less than a preset quantity value after having sequentially performed the first processing process on the neighboring image blocks of the current image block in the first preset order and after having stored the extra to-be-selected motion information set in the candidate motion information list, filling the candidate motion information list with a first preset candidate motion information set until the quantity of candidate motion information sets in the candidate motion information list is equal to the preset quantity value.

2. The method according to claim 1, wherein the extra to-be-selected motion information set comprises at least extra to-be-selected motion information of a first control point and extra to-be-selected motion information of a second control point, wherein the first control point and the second control point are neighboring control points of the current image block.

3. The method according to claim 1, wherein the neighboring affine image block of the current image block is located at a predetermined location on a left side or an upper side of the current image block.

4. The method according to claim 1, wherein the extra to-be-selected motion information set comprises extra to-be-selected motion information of the at least two control points of the current image block, wherein the extra to-be-selected motion information of each control point of the at least two control points comes from an image block at a specific location adjacent to the control point, and wherein an inter prediction mode is used for the image block at the adjacent specific location.

5. The method according to claim 1, further comprising:
obtaining and parsing a bitstream to obtain a first index value and a motion information difference, wherein the first index value is an index value of a motion information predictor of a control point of the current image block in the candidate motion information list;
obtaining the motion information predictor of the control point from the candidate motion information list based on the first index value;
determining motion information of the control point based on the motion information predictor of the control point and the motion information difference; and
determining prediction pixels of the current image block based on the motion information of the control point.

6. The method according to claim 1, further comprising:
obtaining and parsing a bitstream to obtain a second index value, wherein the second index value is an index value of a motion information set of a control point of the current image block in the candidate motion information list;
obtaining the motion information set of the control point from the candidate motion information list based on the second index value; and
determining prediction pixels of the current image block based on the motion information of the control point.

7. The method according to claim 1, wherein extra to-be-selected motion vectors of at least two control points in the extra to-be-selected motion information set that satisfies the preset condition are different.

8. A non-transitory computer-readable medium having processor-executable instructions stored thereon for constructing a candidate motion information list, wherein the processor-executable instructions, when executed, facilitate performance of the following:
generating the candidate motion information list comprising at least one candidate motion information set obtained from a neighboring affine image block of a current image block by using an inherited control point motion vector prediction method, wherein generating the candidate motion information list comprises sequentially performing a first processing process on neighboring image blocks of the current image block in a first preset order, until a quantity of candidate motion information sets in the candidate motion information list is equal to a first preset value or until all neighboring image blocks of the current image block have been traversed, wherein the first processing process comprises:
for an $i^{th}$ ($i \in [1, n]$) neighboring image block, based on the $i^{th}$ neighboring image block being an affine coding block, determining whether the $i^{th}$ neighboring image block and a candidate motion information set that has been stored in the candidate motion information list come from a same coding unit; and
in case that no candidate motion information set from the coding unit to which the $i^{th}$ neighboring image block belongs exists in the candidate motion information list, determining candidate motion information of x control points of the current image block based on motion information of x control points of the $i^{th}$ neighboring image block, and storing, in the candidate motion information list, a candidate motion information set including the candidate motion information of the x control points of the current image block, where n is a quantity of neighboring image blocks of the current image block, and both x and n are integers greater than or equal to 2;
storing, in the candidate motion information list, an extra to-be-selected motion information set that satisfies a preset condition, wherein the extra to-be-selected motion information set comprises extra to-be-selected motion vectors of at least two control points of the current image block, a respective extra to-be-selected motion vector of a respective control point is a motion vector of an inter-coded image block adjacent to the current image block, and reference frame indexes of all control points in the extra to-be-selected motion information set that satisfies the preset condition are the same; and
based on the quantity of candidate motion information sets in the candidate motion information list being less than a preset quantity value after having sequentially performed the first processing process on the neighboring image blocks of the current image block in the first preset order and after having stored the extra to-be-selected motion information set in the candidate motion information list, filling the candidate motion information list with a first preset candidate motion information set until the quantity of candidate motion information sets in the candidate motion information list is equal to the preset quantity value.

9. The non-transitory computer-readable medium according to claim 8, wherein the extra to-be-selected motion information set comprises at least extra to-be-selected motion information of a first control point and extra to-be-selected motion information of a second control point, wherein the first control point and the second control point are neighboring control points of the current image block.

10. The non-transitory computer-readable medium according to claim 8, wherein the neighboring affine image block of the current image block is located at a predetermined location on a left side or an upper side of the current image block.

11. The non-transitory computer-readable medium according to claim 8, wherein the extra to-be-selected motion information set comprises extra to-be-selected motion information of the at least two control points of the current image block, wherein the extra to-be-selected motion information of each control point of the at least two control points comes from an image block at a specific location adjacent to the control point, and wherein an inter prediction mode is used for the image block at the adjacent specific location.

12. The non-transitory computer-readable medium according to claim 8, wherein the processor-executable instructions, when executed, further facilitate performance of the following:
   - obtaining and parsing a bitstream to obtain a first index value and a motion information difference, wherein the first index value is an index value of a motion information predictor of a control point of the current image block in the candidate motion information list;
   - obtaining the motion information predictor of the control point from the candidate motion information list based on the first index value;
   - determining motion information of the control point based on the motion information predictor of the control point and the motion information difference; and
   - determining prediction pixels of the current image block based on the motion information of the control point.

13. The non-transitory computer-readable medium according to claim 8, wherein the processor-executable instructions, when executed, further facilitate performance of the following:
   - obtaining and parsing a bitstream to obtain a second index value, wherein the second index value is an index value of a motion information set of a control point of the current image block in the candidate motion information list;
   - obtaining the motion information set of the control point from the candidate motion information list based on the second index value; and
   - determining prediction pixels of the current image block based on the motion information of the control point.

14. The non-transitory computer-readable medium according to claim 8, wherein extra to-be-selected motion vectors of at least two control points in the extra to-be-selected motion information set that satisfies the preset condition are different.

* * * * *

UNITED STATES PATENT AND TRADEMARK OFFICE
CERTIFICATE OF CORRECTION

PATENT NO. : 11,895,319 B2
APPLICATION NO. : 17/188691
DATED : February 6, 2024
INVENTOR(S) : Chen et al.

Page 1 of 1

It is certified that error appears in the above-identified patent and that said Letters Patent is hereby corrected as shown below:

On the Title Page

Page 2: item (56) Other Publications, Right-Hand Column, Line 8: "11th Meeting: Ljubljana, SI, Document: JVET-K1024-v2, Total 55" should read -- 11th Meeting: Ljubljana, SI, Document: JVET-K1024-v2, Total 44 --.

Signed and Sealed this
Fourteenth Day of May, 2024

Katherine Kelly Vidal
*Director of the United States Patent and Trademark Office*